US011302090B2

(12) United States Patent
Uppal et al.

(10) Patent No.: US 11,302,090 B2
(45) Date of Patent: Apr. 12, 2022

(54) MANOEUVRING ITEMS INTO A BOOT SPACE

(71) Applicant: Ford Global Technologies, LLC, Dearborn, MI (US)

(72) Inventors: Vaibhav Uppal, Basildon (GB); Ulrich Viersbach, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/087,800

(22) Filed: Nov. 3, 2020

(65) Prior Publication Data

US 2021/0134072 A1 May 6, 2021

(30) Foreign Application Priority Data

Nov. 6, 2019 (GB) ..................................... 1916131

(51) Int. Cl.
*G06T 19/20* (2011.01)
*G06T 17/10* (2006.01)
(Continued)

(52) U.S. Cl.
CPC ................. *G06T 19/20* (2013.01); *G06T 7/62* (2017.01); *G06T 17/10* (2013.01); *B65G 43/00* (2013.01); *B65G 67/20* (2013.01); *G06Q 10/04* (2013.01); *G06Q 10/083* (2013.01); *G06Q 10/087* (2013.01); *G06Q 50/28* (2013.01); *G06T 2219/2004* (2013.01)

(58) Field of Classification Search
None
See application file for complete search history.

(56) References Cited

U.S. PATENT DOCUMENTS 9,081,650 B1    7/2015    Brinkmann et al.
9,805,601 B1   10/2017    Fields et al.
(Continued)

FOREIGN PATENT DOCUMENTS

FR     2965647 A1    4/2012
GB     2524952 A    10/2015
(Continued)

OTHER PUBLICATIONS

GB Search Report and Written Opinion for GB 1916131.4 as issued by the GB Intellectual Property Office dated Apr. 27, 2020.
(Continued)

*Primary Examiner* — YuJang Tswei
(74) *Attorney, Agent, or Firm* — Brandon Hicks; Bejin Bieneman PLC

(57) ABSTRACT

A first set of dimensions can be derived corresponding to a real-world space and a second set of dimensions can be derived corresponding to a first physical item in the real-world. Further included is deriving a virtual representation of the real-world space from the first set of dimensions in a virtual environment and deriving a virtual representation of the first physical item from the second set of dimensions in the virtual environment. The virtual representation of the real-world space is represented as a hollow space, and the virtual representation of the first physical item is represented as a solid item that is user-manipulatable within the virtual environment and the virtual representation of the real-world space.

17 Claims, 10 Drawing Sheets

(51) Int. Cl.
*G06T 7/62* (2017.01)
*B65G 67/20* (2006.01)
*G06Q 50/28* (2012.01)
*G06Q 10/08* (2012.01)
*B65G 43/00* (2006.01)
*G06Q 10/04* (2012.01)

(56) References Cited

U.S. PATENT DOCUMENTS

| | | |
|---|---|---|
| 10,268,892 B1 | 4/2019 | Miller et al. |
| 10,319,150 B1 | 6/2019 | Canada et al. |
| 2004/0115802 A1 | 6/2004 | Dickson et al. |
| 2010/0287487 A1 | 11/2010 | Parker et al. |
| 2015/0022522 A1 | 1/2015 | Li et al. |
| 2015/0094876 A1 | 4/2015 | Baldwin |
| 2016/0061625 A1 | 3/2016 | Wang |
| 2016/0358474 A1 | 12/2016 | Uppal |
| 2017/0178333 A1 | 6/2017 | Zhang et al. |
| 2017/0189797 A1* | 7/2017 | Muthyala ............ A63F 13/655 |
| 2017/0330379 A1 | 11/2017 | Bojanowski et al. |
| 2018/0057284 A1 | 3/2018 | Carpenter et al. |
| 2019/0051051 A1* | 2/2019 | Kaufman ................ G06F 3/01 |
| 2019/0279426 A1 | 9/2019 | Musunuri et al. |

FOREIGN PATENT DOCUMENTS

| | | |
|---|---|---|
| GB | 2539030 A | 12/2016 |
| GB | 2555524 A | 5/2018 |
| WO | 2004053682 A1 | 6/2004 |
| WO | 2017201191 A1 | 11/2017 |

OTHER PUBLICATIONS

Examination Report as issued by the GB Intellectual Property Office dated Apr. 6, 2021.

GB Examination Report as issued by the GB Intellectual Property Office dated Jul. 29, 2021.

* cited by examiner

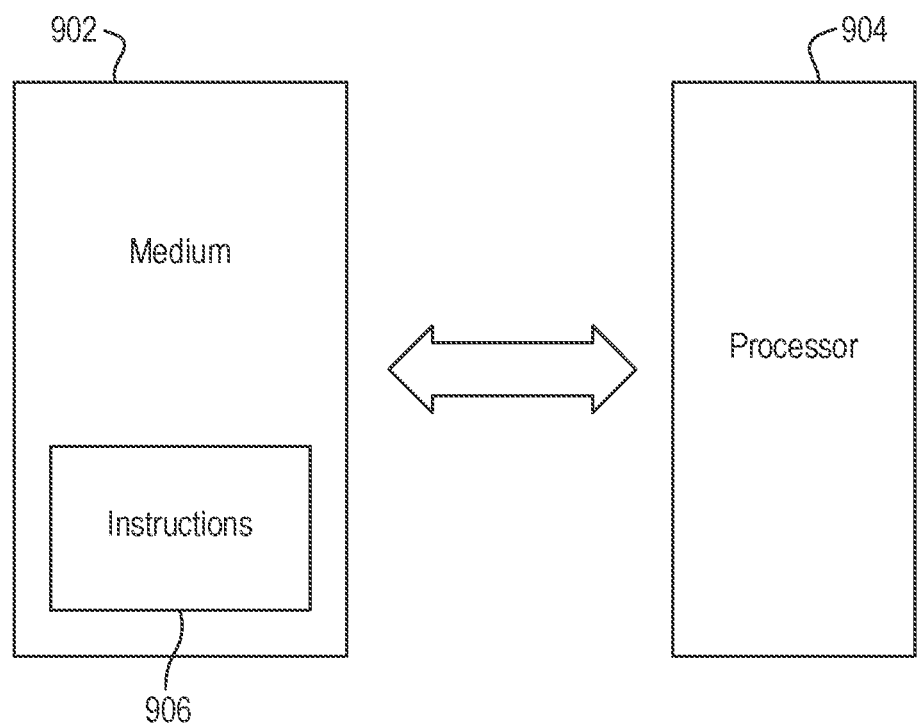

MANOEUVRING ITEMS INTO A BOOT SPACE

CROSS-REFERENCE TO RELATED APPLICATIONS

This patent application claims priority to Great Britain Application No. 1916131.4, filed Nov. 6, 2019, which is hereby incorporated herein by its reference in its entirety.

BACKGROUND

Some users can find it challenging to assess whether items (e.g. luggage) they want to transport (e.g. in a vehicle) can fit into a space (e.g. a vehicle's boot space). Furthermore, some users can find it challenging to assess the best way in which a plurality of items can fit into a space. In other words, it can be challenging to determine how best to pack a plurality of items into a space such that a maximum amount of items may be transported in that space.

BRIEF DESCRIPTION OF FIGURES

For a better understanding of the present disclosure, and to illustrate how certain examples may be put into effect, examples will now be described with reference to the accompanying drawings in which:

FIG. 9 is a schematic diagram of a machine-readable medium in association with a processor.

DETAILED DESCRIPTION

Figure 1:
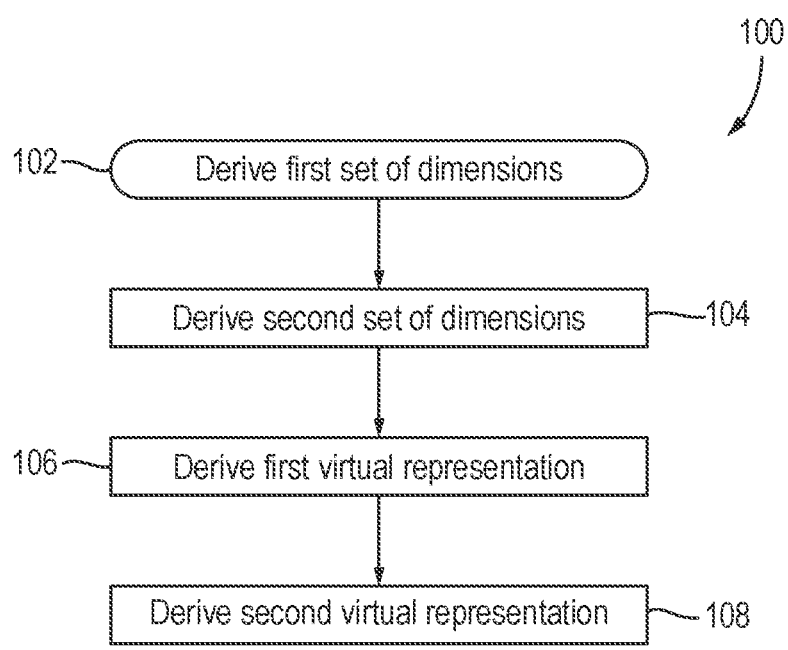
FIG. 1 is a flowchart of an example method.

The present disclosure relates to the placing of individual items within a target three-dimensional space. Particularly, although not exclusively, the disclosure relates to determining ways of placing a plurality of items within a confined space, such as the boot space of a vehicle, for storage or transport.

Some examples herein provide a user-friendly way to determine an optimum packaging exercise, for example to enable a user to determine possible ways in which an item can fit into a (real-world, physical) space and thereby enable the user to determine the "best" way that a plurality of items can fit into the space.

According to some examples herein there is provided a means for a user to manipulate a virtual representation of a first item (e.g. an item of luggage), to be fitted into a real-world space (such as a vehicle boot). Some examples herein thereby enable a user to perform a packing exercise virtually to thereby avoid the somewhat tedious task of physically maneuvering items into the space and face situations where the items do not all fit. To accomplish this, some examples herein relate to building a virtual representation of an item to be fit in a space and to building a virtual representation of the space, such that the virtual representation of the item is manipulatable, by a user, within the virtual representation of the space, allowing the user to, virtually, manipulate the item within the space to assess various configurations of the item in the space to determine how the item might be loaded in the space in the real-world.

Therefore, to enable this determination to be applicable to the real-world, the (e.g. virtual) dimensions of the item to be fit into a space correspond to the physical dimensions of the item in the real world and, similarly for the (e.g. virtual) dimensions of the (real-world) space (e.g. a vehicle boot space). For example, if the virtual item appears to take up one-third of the virtual space then the user can assume, with a reasonably high degree of confidence, that the real-world item will take up approximately one-third of the real-world space. By way of another example, if the virtual representation of the item is not able to fit in the virtual space, e.g. even with manipulation by the user (e.g. rotating the item) then the user can assume, with a reasonably high degree of confidence, that the real-world item will not fit in the real-world space. By extension, if, the user concludes, based on the virtual reality build by some examples herein, that the virtual representation of a plurality of items (e.g. a plurality of virtual representations, each representation being of a respective real-world item) cannot fit into virtual representation of a space, the user can assume, with a reasonably high degree of confidence, that the plurality of items will not be able to all fit within the space. In this last example, this may lead the user to divide up the plurality of items into two sets, each set to be placed in a different, respective, space.

Some examples herein therefore relate to building a virtual environment, the virtual environment comprising a virtual representation of a physical item and a virtual representation of a real-world space, such that the virtual item is manipulatable (e.g. user-manipulatable), for example moveable and/or rotatable, within the virtual space so that the user, e.g. through trial and error, may virtually try and fit the virtual item in the virtual space to determine whether (and/or how) the real-world item may fit into the real-world space.

According to a first example there is provided a method comprising deriving a first set of dimensions corresponding to a real-world space, deriving a second set of dimensions corresponding to a first physical item in the real-world, deriving a virtual representation of the real-world space from the first set of dimensions in a virtual environment, deriving a virtual representation of the first physical item from the second set of dimensions in the virtual environment, wherein the virtual representation of the real-world space is represented as a hollow space, and wherein the virtual representation of the first physical item is represented as a solid item that is user-manipulatable within the virtual environment and the virtual representation of the real-world space.

The first set of dimensions may be virtual dimensions that substantially correspond to the real-world dimensions of the real-world space. The second set of dimensions may be virtual dimensions that substantially correspond to the real-world dimensions of the first physical item. Alternatively, the first set of dimensions may be the real-world dimensions of the real-world space and/or the second set of dimensions may be the real-world dimensions of the first physical item.

Accordingly, deriving the first and/or second set of dimensions may comprise at least one of: measuring the real-world dimensions of the real-world space and/or the first physical item, extracting the real-world dimensions of the real-world space and/or the first physical item form a dataset; and determining the real-world dimensions of the real-world space and/or the first physical item.

In other words, in one example real-world dimensions of the physical item and/or space may be obtained and a virtual representation may be built from the real-world dimensions. In other examples, virtual dimensions may characterise the physical item and/or space and the virtual dimensions may be stored as a way of storing a representation of the physical item and/or space and the virtual dimensions may be used to build the virtual representation. In either example, the dimensions may be stored in a database and deriving the dimensions may comprise accessing the database and retrieving the (real-world or virtual) dimensions from the database.

In other examples, the virtual representation of the first physical item and/or the real-world space may be stored in a database and deriving the virtual representation may comprise accessing the database to retrieve the stored virtual representation. As dimensions may characterise the virtual representation, storing the representation may comprise storing the dimensions (real-world or virtual).

According to the method of this example, the virtual representation of the real-world space is represented as a hollow space, and wherein the virtual representation of the first physical item is represented as a solid item that is user-manipulatable (e.g. moveable, e.g. rotatable/translatable etc.) within the virtual environment and the virtual representation of the real-world space, for example, for example such that the virtual representation of the first physical item is moveable through the boundaries of the virtual representation of the real-world space. This may enable a user to determine whether and/or how the first physical item can fit in the real-world space by manipulating the virtual representation of the first physical item in the virtual representation of the real-world space.

If the virtual representation of the first physical item intersects with a boundary of the virtual representation of the real-world space, the method may further comprise changing the virtual representation of at least one of the first physical item and the boundary intersecting the first physical item.

In other words, the representation of the item and/or intersecting boundary is changed to provide a visual indication that the virtual configuration of the time in the space cannot be achieved in the real-world. Since the boundary in the real-world corresponding to the virtual boundary which the item intersects will be a physical boundary (e.g. walls of a vehicle boot space) a physical intersection between the physical item and this physical boundary is not possible. The changing representation therefore provides a visual indicator to the user that, if the virtual item is intersecting the virtual boundary, this corresponds to the physical item being "through a wall". Changing the visual representation may therefore comprise modifying the appearance of the visual representation of the first physical item or the boundary of the virtual representation of the real-world space that intersects with the virtual representation of the first physical item.

The virtual representation of the real-world space may comprise a number of bounding faces defining the hollow space as a three-dimensional volume therebetween bounded by the bounding faces, wherein each face represents a boundary of the virtual representation of the real-world space, and wherein at least one of the bounding faces represents an entrance to the virtual representation of the real-world space, and, if the virtual representation of the first physical item intersects with a bounding face of the virtual representation of the real-world space, the method further comprises modifying the virtual representation of at least one of the first physical item and the bounding face intersecting the first physical item, unless the bounding face is the entrance to the virtual representation in which case the appearance of the virtual representation of a physical item and/or the virtual representation of the real-world space is not modified. In other words, the method may comprise not modifying (or changing) the appearance of the virtual representation of the physical item and/or real-world space if the item intersects the bounding face designated as the entrance to the virtual representation of the real-world space.

In some examples at least one of the bounding faces may be penetrable by the virtual representation of the first physical item—e.g. a user may be able to drag the virtual representation of the first physical item through the penetrable bounding face. In some examples at least one of the bounding faces may be impenetrable by the virtual representation of the first physical item—e.g. a user may be unable to drag the virtual representation of the first physical item through the impenetrable bounding face, which acts in this example as a hard stop to the first physical item.

A user may be able to configure a bounding face as either penetrable or impenetrable, or they may be automatically designated. For example, an entrance to the virtual representation of the real-world space may be penetrable and a user may designate a face to be the entrance, or data describing the real-world space (e.g. CAD data) may designate a face to be the entrance. Any number of bounding faces may be penetrable or impenetrable and these may be user-designated or automatically designated. In other words, a user may configure any number of faces (or surfaces) of the virtual representation of the real-world space to be penetrable.

In one example, a face may be designated as the entrance to the virtual space, and therefore penetrable, with all remaining faces of the virtual space being designated as impenetrable. In this way, according to some examples herein, an indication may be provided to a user as to whether a virtual item may be able to fit through the entrance. For example, the real-world item may be able to fit in (e.g. within) the real-world space but the item may be too big to actually get in through the entrance. Some examples herein visually indicate to the user that this is the case, e.g. in the manner described above where the representation of the virtual item and/or virtual space is changed, to thereby indicate to the user that the item cannot fit through the entrance (since in this example where the virtual item cannot fit in the entrance it will intersect another face of the virtual space that is not designated as the entrance.

The method may further comprise placing the virtual representation of the first physical item in the virtual representation of the real-world space. This may be done automatically, for example by a processor or under the control of a controller, such as a control unit, for example (as will be described below, by a processor caused by machine-executable instructions). This may be done according to a control algorithm, for example an optimisation algorithm that is configured to place the virtual representation of the first physical item into the virtual representation of the real-world space such that a parameter is optimised.

The method may further comprise instructing a user to place the first physical item in the real-world space according to the virtual configuration of the virtual representation of the first physical item being in the virtual representation of the real-world space.

The method may further comprise deriving a third set of dimensions corresponding to a second physical item, deriving a virtual representation of the second physical item from the third set of dimensions in the virtual environment wherein the virtual representation of the second physical item is represented as a solid item that is user-manipulatable within the virtual environment and the virtual space. In other words, according to the method, virtual representations of first and second items may be derived (e.g. created) and these may be user-manipulatable within the virtual space to enable a user to determine a configuration according to which that the first and second items may be placed in the virtual space—the user may then adopt this configuration to place the real-world items in the real-world space.

The virtual representations of the first physical item and second physical item may not be permitted to at least one of: pass through, overly, overlay, clash, and mesh. In other words, as the virtual representations are of physical items, the virtual representations should appear to obey the laws of physics, being applicable to the physical items in the real-world—and therefore the virtual representations should not pass through one another, and should be able to be "stacked" on top of one another. In other words, each virtual representation of the items are "viewed" by the other as a solid object, and the collision of two representations should not result in the appearance that one has passed through the other. In this way, the user may not just view how the two items may be placed side-by-side in the space but how they may be stacked on top of one another. In this example therefore, a virtual representation of a physical item may only intersect with a surface of the virtual representation of the real-world space, and not with a virtual representation of another physical item. Of course, in some examples a virtual representation of a physical item may not intersect with the virtual representation of the real-world space (e.g. depending on the number of faces of the virtual space that are designated as impenetrable).

If the virtual representation of the second physical item intersects with a boundary of the virtual representation of the real-world space (e.g. a bounding face thereof, as described above), the method may further comprise changing the virtual representation of at least one of the second physical item and the boundary intersecting the first physical item. The method may further comprise modifying the appearance of the visual representation of the second physical item or the boundary of the virtual representation of the real-world space that intersects with the virtual representation of the second physical item. As above, this provides a visual indication to the user that the depicted configuration of the second item in the space is not possible in the real-world.

The method may comprise modifying the appearance of the virtual representation of a physical item when the virtual representation is fully contained within the virtual representation of the real-world space. This gives the user a visual indication as to whether the physical item can fit in the real-world space in the shown configuration or not.

The method may further comprise arranging, e.g. by a processor or under the control of a controller, the virtual representations of the first and second physical items so that both items fit within the virtual representation of the real-world space. This may be done automatically, for example, according to an optimisation algorithm that is to optimise a parameter (e.g. the remaining three-dimensional space in the virtual space once all of the items are stored in the space, or the maximum number of items that can fit in the virtual space).

To derive a set of dimensions (e.g. the first, second or third set of dimensions), the method may further comprise selecting a first position, selecting a second position to define a one-dimensional line between the first and second positions, selecting a third position to define a two-dimensional area spanned by the first, second, and third position, and selecting a fourth position to define a three-dimensional volume spanned by the first, second, third, and fourth positions, the three-dimensional volume being the virtual representation of the first or second physical item or real-world space (e.g. the line between the first and second positions defines a virtual width, the line between the first or second and third positions defines a virtual length and the line between the first, second, or third, positions and the fourth position defines a virtual depth). In this way, to obtain the most accurate set of dimensions the first, second, third and fourth positions may each correspond to a respective corner of an object (e.g. the item of the space). This may be done manually, e.g. by a user tapping a screen of a smart device (e.g. when viewing a real-world object through the camera and tapping on the screen at a location corresponding to a real-world boundary of the item) or automatically. In this way, objects with non-regular shapes may be approximated by rectangular prisms. Although, in other examples, the virtual representations of either a physical item or real-world space may be other than rectangular. For example, a user may device that a different shape may be used to approximate a real-world item, or a representation of any number of faces (e.g. pentagonal prism, hexagonal prism, etc.) may be derived for either the representation of the physical item or real-world space.

To derive a set of dimensions of the first physical object, the second physical object, and/or the real-world space, the method may comprise selecting a first position (e.g. a virtual position in the virtual environment), selecting a second position (e.g. a virtual position) to define a one-dimensional line between the first and second positions, selecting a third position (e.g. a virtual position) to define a two-dimensional area spanned by the first, second, and third position, and selecting a fourth position (e.g. a virtual position) to define a three-dimensional volume spanned by the first, second, third, and fourth positions, wherein at least one dimension in the set of dimensions is the length of a line between two of the four positions.

To derive a virtual representation of the first physical object, the second physical object, and/or the real-world space, the method may comprises selecting a virtual first position in the virtual environment, selecting a virtual second position in the virtual environment to define a one-dimensional virtual line between the first and second virtual positions, selecting a virtual third position to define a two-dimensional virtual area spanned by the first, second, and third virtual positions, and selecting a fourth virtual position to define a three-dimensional virtual volume spanned by the first, second, third, and fourth positions, the three-dimensional virtual volume being the virtual representation of the first physical item, the second physical item, or real-world space, respectively. This may be done by a user using a smart device, for example a smart phone, or a camera thereof. This may be done by a user as the user is viewing the physical item through a camera of their smart phone, in which case the user may tap the screen of the smart device to mark the first virtual position at a position that corresponds, through the camera, to a corner of the item etc. The user may move the smart device to view another corner of the item to mark the second position etc.

The method may further comprise at least one of: storing real-world dimensions in a database; and storing virtual dimensions, corresponding to real-world dimensions in a database, for example, the dimensions may comprise the dimensions (virtual or real-world) of the first virtual item, real-world space, and/or second virtual item.

The method may further comprise storing at least one of the first set of dimensions, the second set of dimensions, the third set of dimensions, the virtual representation of the first physical item, the virtual representation of the real-world space, and the virtual representation of the second physical item, in a database.

As stated above, the virtual representation of the first item and/or the representation of the second physical item may not be permitted to cross a virtual boundary of the virtual representation of the real-world space. In this example, the virtual representation of the real-world space may comprise a number of bounding faces, each face representing a boundary of the virtual space, with one of those faces being an entrance to the virtual space, the virtual representation of the first item and/or the virtual representation of the second physical item being movable through this face but not the other faces.

For example, as the real-world space is a three-dimensional volume, the virtual representation of the real world space may comprise six faces, two of which may be identified as the respective "top" and "bottom" of the space, the remainder of which may be identified as the "sides" of the space. The three-dimensional volume spanned by these faces, or boundaries, or boundary surfaces, may therefore correspond to the real-world space. According to the example method, one of these boundary faces may be a designated "entrance" to the virtual space, the designated entrance corresponding to a real-world entrance to the space. For example, if the real-world space is a vehicle boot space, one of the bounding faces of the virtual representation of the space will correspond to the boot, or trunk, of the vehicle. In the real world, the boot, or trunk, will be openable/closeable with respect to the remainder of the boot space but in the virtual representation the face corresponding to the boot may be designated the entrance and the virtual representations of the first and second physical items may be able to pass through, or move through, this face without the virtual environment changing. A user may be able to designate the face representing the entrance to the virtual space, and therefore the method may comprise designating one virtual face of the virtual representation of the real-world space as an entrance to the virtual space.

According to another example there is provided a method comprising creating a virtual representation of an item in a virtual environment, and creating a virtual representation of a three-dimensional space in the virtual environment, wherein the virtual representation of the item is user-manipulatable within the virtual representation of the three-dimensional space such that a user is able to determine whether the virtual representation of the item is able to fit within the virtual representation of the three-dimensional space.

According to another example there is provided a method comprising deriving a set of dimensions corresponding to a first physical item in the real-world and deriving, from the set of dimensions, a virtual representation of the first physical item in a virtual environment by selecting a virtual first position in the virtual environment, selecting a virtual second position in the virtual environment to define a one-dimensional virtual line between the first and second virtual positions, selecting a virtual third position to define a two-dimensional virtual area spanned by the first, second, and third virtual positions, and selecting a fourth virtual position to define a three-dimensional virtual volume spanned by the first, second, third, and fourth positions, the three-dimensional virtual volume being the virtual representation of the first physical item, the second physical item, or real-world space, respectively, and wherein the virtual representation of the first physical item is represented as a solid item that is user-manipulatable within the virtual environment.

In this example, a virtual representation of a physical item (e.g. luggage or a box containing an item-to-be-purchased) may be superimposed onto an actual image of the real-world. For example, the virtual representation may be superimposed onto the feed from a camera, e.g. of a smart device, such that a user may manipulate the virtual representation of the physical item to determine whether, or how, it can fit in the space, by placing it in an image of the actual space (rather than a virtual representation thereof as per previously discussed examples).

This example may have particular utility in, for example, a user wishes to purchase an item from a store and they are able to download data representative of the dimensions of the box in which the item will be delivered. A user may download the data (which may comprise CAD data) or may manually enter the dimensions of the box—in either case this will derive the virtual representation of the box in which the user will receive the item if they purchase it. Then, the user may walk to their vehicle, open the boot space, and view it through a camera of a smart device and superimpose the virtual representation of the box to determine how and whether it will fit in the boot space.

According to another example there is provided a controller that is configured to perform any of the methods described above.

According to another example there is provided a non-transitory and machine-readable medium having instructions stored thereon, wherein the instructions, when executed by a processor, are to cause the processor to perform any of the methods as described above.

For example, the instructions, when executed by a processor, may be to cause the processor to derive a first set of dimensions corresponding to a real-world space, derive a second set of dimensions corresponding to a first physical item in the real-world, derive a virtual representation of the real-world space from the first set of dimensions in a virtual environment, derive a virtual representation of the first physical item from the second set of dimensions in the virtual environment, wherein the virtual representation of the real-world space is represented as a hollow space, and wherein the virtual representation of the first physical item is represented as a solid item that is user-manipulatable within the virtual environment and the virtual representation of the real-world space. Deriving, as will be explained below, may comprise measuring or manually entering the dimensions, e.g. from a list, or reading the dimensions off the item itself.

In this way, the instructions may cause the processor to create a virtual representation of the first physical item that is moveable through the boundaries of the virtual representation of the real-world space, for example enabling a user to determine whether and/or how the first physical item can fit in the real-world space by manipulating the virtual representation of the first physical item in the virtual representation of the real-world space.

The instructions, when executed by a processor, may be to cause the processor to change the virtual representation of at least one of the first physical item and the boundary intersecting the first physical item if the virtual representation of the first physical item intersects with a boundary of the virtual representation of the real-world space.

The instructions, when executed by a processor, cause the processor to modify the appearance of the visual representation of the first physical item or the boundary of the virtual representation of the real-world space that intersects with the virtual representation of the first physical item.

To derive the first and/or second set of dimensions, the instructions, when executed by a processor, may cause the processor to at least one of: measure the real-world dimensions of the real-world space and/or the first physical item, extract the real-world dimensions of the real-world space and/or the first physical item form a dataset; and determine the real-world dimensions of the real-world space and/or the first physical item.

The instructions, when executed by a processor, may cause the processor to place the virtual representation of the first physical item in the virtual representation of the real-world space.

The instructions, when executed by a processor, may cause the processor to instruct a user to place the first physical item in the real-world space according to the virtual configuration of the virtual representation of the first physical item being in the virtual representation of the real-world space.

The instructions, when executed by a processor, may cause the processor to derive a third set of dimensions corresponding to a second physical item, and derive a virtual representation of the second physical item from the third set of dimensions in the virtual environment wherein the virtual representation of the second physical item is represented as a solid item that is user-manipulatable within the virtual environment and the virtual space.

The instructions, when executed by a processor, may cause the processor to derive the virtual representations of the first physical item and second physical item such that they are not permitted to at least one of: pass through, overly, overlay, clash, and mesh.

The instructions, when executed by a processor, may cause the processor to change the virtual representation of at least one of the first physical item, the second physical item and a boundary of the virtual representation of the real-world space, if the virtual representation of the first or second physical item, respectively, intersects with the boundary.

The instructions, when executed by a processor, may cause the processor to modify the appearance of the visual representation of the first physical item or the boundary of the virtual representation of the real-world space that intersects with the virtual representation of the first physical item if the virtual representation of the second physical item intersects with a boundary of the virtual representation of the real-world space.

The instructions, when executed by a processor, may cause the processor to arrange the virtual representations of the first and second physical items so that both items fit within the virtual representation of the real-world space.

To derive a set of dimensions (or a virtual representation), the instructions, when executed by a processor, may cause the processor to select a first position, select a second position to define a one-dimensional line between the first and second positions, select a third position to define a two-dimensional area spanned by the first, second, and third position, and select a fourth position to define a three-dimensional volume spanned by the first, second, third, and fourth positions, the three-dimensional volume being the virtual representation of the first or second physical item or real-world space (e.g. the line between the first and second positions defines a virtual width, the line between the first or second and third positions defines a virtual length and the line between the first, second, or third, positions and the fourth position defines a virtual depth).

The instructions, when executed by a processor, may cause the processor to at least one of: store real-world dimensions in a database, and store virtual dimensions, corresponding to real-world dimensions in a database.

The instructions, when executed by a processor, may cause the processor to store at least one of the first set of dimensions, the second set of dimensions, the third set of dimensions, the virtual representation of the first physical item, the virtual representation of the real-world space, and the virtual representation of the second physical item, in a database.

The virtual representation of the first item and/or the representation of the second physical item may not be permitted to cross a virtual boundary of the virtual representation of the real-world space.

The virtual representation of the real-world space may comprise a number of bounding faces, each face representing a boundary of the virtual space, with one of those faces being an entrance to the virtual space, the virtual representation of the first item and/or the virtual representation of the second physical item being movable through this face but not the other faces.

The instructions, when executed by a processor, may cause the processor to create a virtual representation of an item in a virtual environment, and create a virtual representation of a three-dimensional space in the virtual environment, wherein the virtual representation of the item is user-manipulatable within the virtual representation of the three-dimensional space such that a user is able to determine whether the virtual representation of the item is able to fit within the virtual representation of the three-dimensional space.

In this way, examples herein relate to using augmented reality technology to provide a user friendly way to conduct a virtual packing exercise and avoid instances where an (e.g.) luggage does not fit in a boot space which can cause delays to the user's journey. The augmented reality provides a way to superimpose a virtual representation of a physical item onto an image (e.g. a camera feed) of a real-world space or a virtual representation of the real-world space. In this way, virtual representations of physical items or spaces may be created from the actual items or spaces in the real-world, and may be viewed through a camera feed in conjunction with the real-world items or spaces.

The instructions and computer program product described herein can provide an easily available app, e.g. on a smart device such as a smart phone, facilitating a quick and easy way to virtually do a luggage packaging exercise to see the best way to do the packing. The simulations of boot-space and the luggage can be saved for future use, further easing out the packing operation. Also, in examples where the real-world space is a vehicle, the solution measures the access into the vehicle, for example the boot, side doors of the car, rear cargo door or side cargo door, allowing the user to assess whether the luggage can enter the vehicle, given the access space available.

The present disclosure relates to a storing items in a space, e.g. for transport and/or storage. The figures will exemplify a vehicle as the real-world space in which an item will be placed. This is for exemplary purposes only and the space may be other than a vehicle. The vehicle in the examples that follow is depicted as a van but the principles of this disclosure hold for any type of vehicle, such as a motor vehicle (e.g. car, van, truck, motorcycle etc.), industrial or agricultural vehicles (e.g. tractor, forklift, bulldozer, excavator etc), marine vessel, aircraft or any other type of vehicle.

FIG. 1 shows an example method 100 which may comprise a computer-implemented method and which may comprise a method of loading at least one item into a space, or a method of loading a plurality of items into a space, or a method of optimising at least one item into a space.

The method 100 comprises step 102 at which a first set of dimensions, corresponding to a real-world space, are derived, e.g. by a processor. At step 104, the method comprises deriving, e.g. by a processor, a second set of dimensions, the second set of dimensions corresponding to a first physical item in the real-world. The real-world space may be a vehicle boot space, or a vehicle cargo area, or a loading area (e.g. the interior of a shipping container)—any real-world space in which an item may be placed and in which it may be intended to place at least one item, for example for storage or transportation. The first physical item may be an item of cargo or luggage (e.g. a bag) or a package or even a person etc.

At step 106 the method comprises deriving, e.g. by a processor, a virtual representation of the real-world space from the first set of dimensions in a virtual environment. At step 108 the method comprises deriving, e.g. by a processor, a virtual representation of the first physical item in the virtual environment. Steps 106 and/or step 108 may comprise building the virtual environment. The virtual environment may substantially resemble a real-world environment. The virtual representation of the first physical item may substantially resemble the first physical item. The virtual representation of the real-world space may substantially resemble the real-world space.

As will be explained later, block 106 comprises deriving the virtual representation of the real-world space such that the real world space is represented in the virtual environment as a hollow space, and block 108 comprises deriving the virtual representation of the first physical item such that the first physical item is represented in the virtual environment as a solid object that is user-manipulatable within the virtual environment and within the virtual representation of the real-world space. This will be discussed in greater detail with reference to some specific examples below.

Figure 2A:
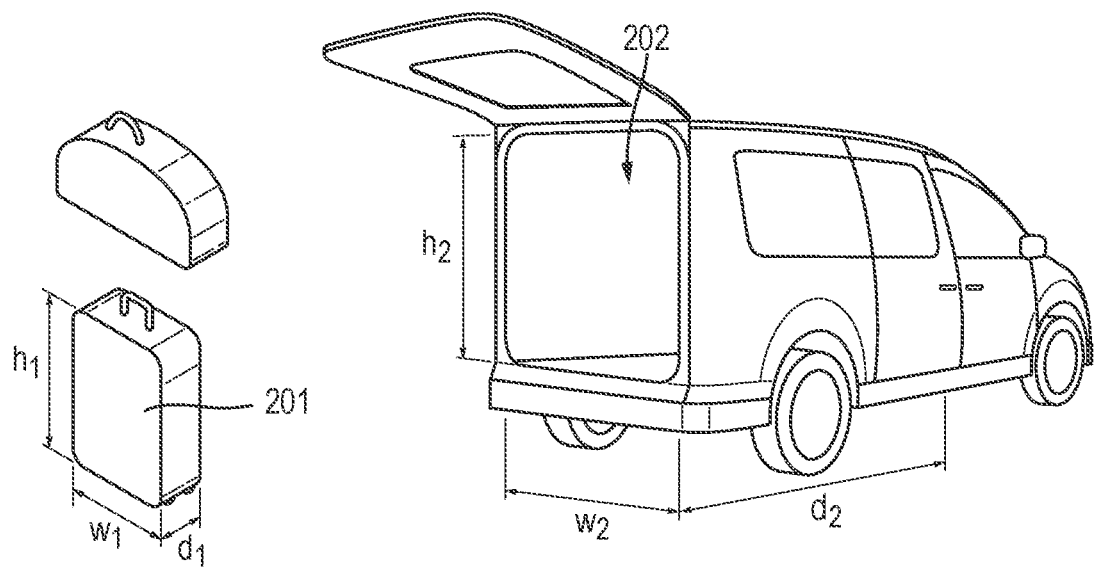
FIG. 2A is schematic diagram of an example item of luggage to be stored in an example vehicle boot space/cargo area.

FIG. 2A illustrates a first physical item 201 that, in this example, is intended to be placed into a real-world space 202 that is, for exemplary and illustrative purposes, depicted as a suitcase. In other examples, the first item 201 may be a person, other item of luggage (e.g. a handbag) or cargo such as a box etc. FIG. 2A illustrates a real-world space 202 that is, for exemplary and illustrative purposes, depicted as a vehicle boot space. In other examples the space 202 may comprise another type of space, e.g. a container, cargo area (e.g. of a van or truck), etc. Therefore, in the real-world example shown schematically in FIG. 2A, the item of luggage 201 is to be placed within the vehicle boot space 202.

Figure 2B:
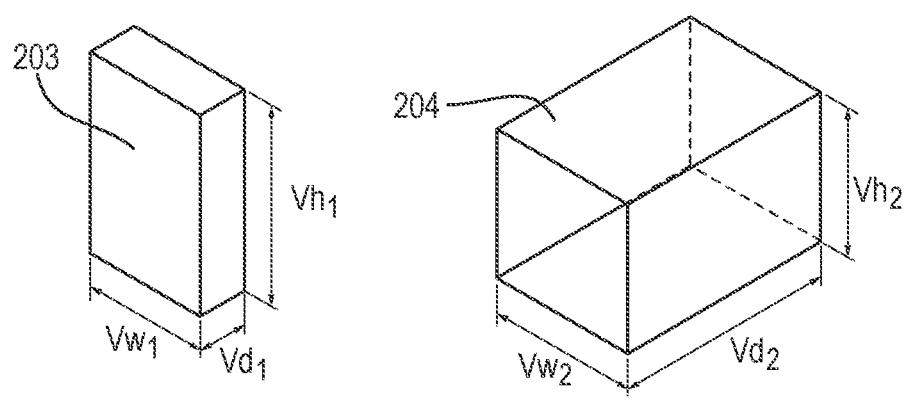
FIG. 2B is a schematic diagram of a virtual environment showing virtual representations of the item of luggage and cargo area of FIG. 2A.

FIG. 2B shows a virtual representation 203 of the first physical item 201 and a virtual representation 204 of the real-world space 202, e.g. that have been derived according to a set of dimensions according to the method 100. In the FIG. 2B example, the representations of the item and the space are each substantially rectangular (e.g. rectangular prisms). In this example, each representation is a three-dimensional representations.

The first physical item 201 and the real-world space 202 each have a respective set of dimensions. In other words, as each of 201 and 202 occupies a three-dimensional volume each of 201 and 202 has a respective depth, width, and height. These dimensions are shown in FIG. 2A. The first physical item 201 has a depth d1, width w1 and height h1 and the real-world space has a depth d2, width w2 and height h2. It will be appreciated that these measurements may be arbitrarily assigned and therefore may change with rotation of the item/space—for example in rotating the item by 90 degrees the depth may be re-named the height etc. Deriving the first and second sets of dimensions (e.g. as in steps 102 and 104, respectively, of the method 100) may comprise obtaining these real-world dimensions. In other examples, deriving the first and second respective sets of dimensions may comprise measuring the item and/or the real-world space. In this example, a smart device may automatically measure the dimension of the item, e.g. following the capture of an image of the item, or may implement automatic measuring software that is capable of determining the dimensions of an item that the smart device is viewing through a camera. In other examples, deriving the first and second respective sets of dimensions may comprise extracting the real-world dimensions, e.g. from a database or from an image (e.g. automatically, by a processor). In other examples, deriving the first and second respective sets of dimensions may comprise determining the real-world dimensions, for example by automatically implementing, e.g. by a processor, an algorithm enabling the dimensions to be determined. In some examples, data may be downloaded (e.g. CAD data that may be used to build the virtual representation of the real-world space) but may be modified by a user to take into account any modifications to the real-world space. For example, CAD data for a vehicle boot space may be supplied (e.g. available to download) from the manufacturer of that vehicle but a user may have modified the boot space of their own vehicle. In this case, after downloading the CAD data for that general vehicle type the user may then modify the data to take into account any changes that they have made to their vehicle (e.g. placement of a spare tyre, etc.).

Referring again to FIG. 2B, the virtual representations 203 and 205 each have an associated set of virtual dimensions. The virtual representation of the first physical item (hereafter the "first virtual representation") has an associated virtual depth vd1, virtual width vw1, and virtual height vh1, and the virtual representation of the real-world space (hereafter the "second virtual representation") has an associated virtual depth vd2, virtual width vw2, and virtual height vw2. Each set of virtual dimensions may substantially correspond to the associated real-world set of dimensions. For example, the virtual depth vd1 of the first virtual representation may substantially corresponding to the depth d1 of the first physical item etc. In other words, each virtual dimension may substantially correspond to its associated real-world dimension. The virtual dimensions may therefore each be in the same proportion to one another as their associated real-world dimensions. For example, if the height h1 of the first physical item is three times its depth d1 and twice its width w2 then the virtual height vh1 may be three times the virtual depth vd1 and twice the virtual width vw2, etc.

As explained above, and with reference to FIG. 2B, the second virtual representation is a hollow space. In other words, the real-world space 202 is virtually represented as a hollow three-dimensional volume 204. In this sense, "hollow" means that another virtual object is able to pass through the walls, or faces, of the three-dimensional volume 204. For example, the first virtual representation is a solid object in the virtual environment. Therefore, the first virtual representation is moveable in the virtual environment and moveable into, and through, the second virtual representation. As will be explained below, this will allow a user to virtually determine whether and how the virtual item can fit in the virtual space and they may then apply those findings to the real world situation shown in FIG. 2A.

Figure 3A:
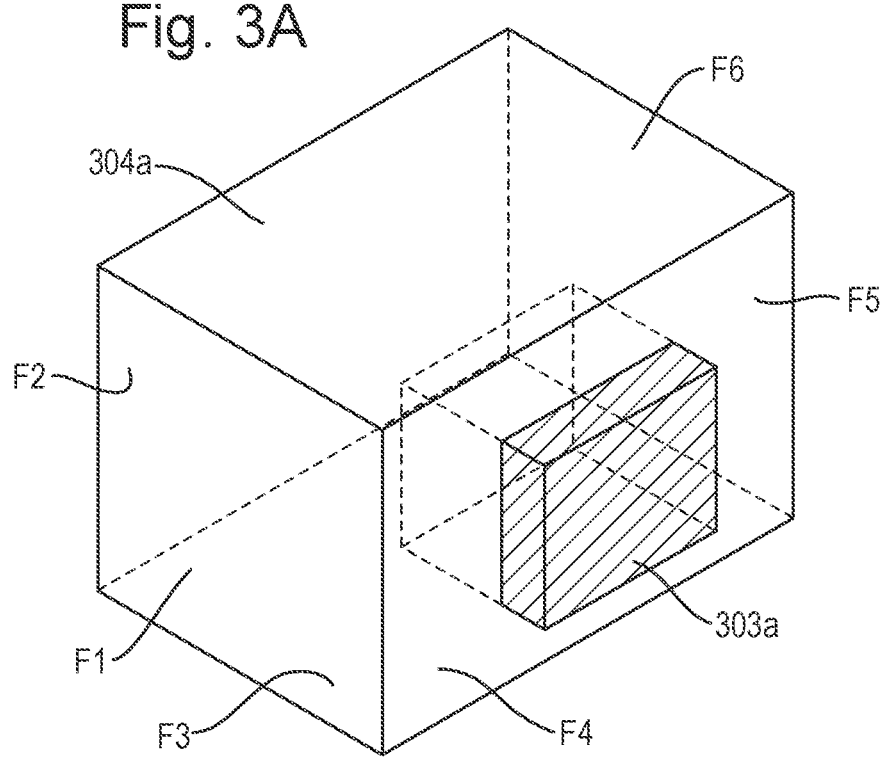
FIG. 3A is a schematic diagram of virtual environments showing a virtual representation of a physical item intersecting a (non-entrance) face of a virtual representation of a real-world space.
Figure 3B:
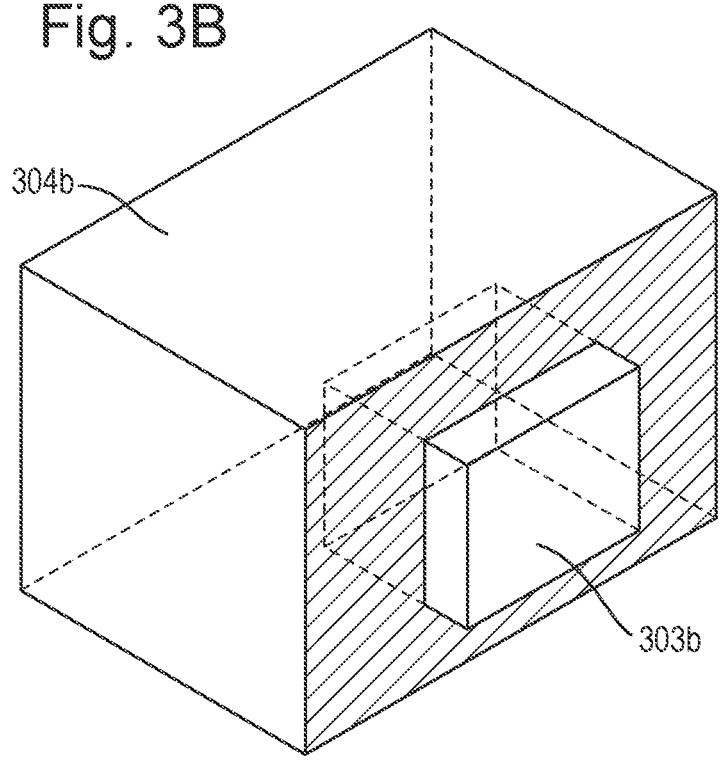
FIG. 3B is a schematic diagram of virtual environments showing a virtual representation of a physical item intersecting a (non-entrance) face of a virtual representation of a real-world space.

FIGS. 3A and 3B show two example first and second virtual representations, respectively, 303a,b and 304a,b. The configuration of the first virtual representation within the second virtual representation, depicted in FIGS. 3A and 3B, may be the result of user-manipulation of the first virtual representation. In other words, a user may have manipulated (e.g. moved) the first virtual representation to its depicted position within the second virtual representation.

When the first virtual representation "clashes" with the second virtual representation—e.g. when the first virtual representation is moved to a configuration where part of the first virtual representation collides with the part of the second virtual representation, for example where part of the first virtual representation intersects with part of the second virtual representation—one of the first and second virtual representations may be modified, or their appearance may be changed. In the examples shown in FIGS. 3A and 3B the first virtual representation is moved to a configuration within the second virtual representation where part of the first virtual representation is intersecting with one of the faces of the second virtual representation. In these examples the first virtual representation is effectively shown to be protruding out of one of the faces of the second virtual representation. In these examples, the appearance of at least one of the objects in the virtual environment is modified to give a visual indication to the user that the depicted configuration of the virtual items in the virtual environment is not possible in the real-world—since in the examples depicted in FIGS. 3A and 3B this would mean that an item of luggage is effectively disposed in the middle of a vehicle side panel, for example.

In the FIG. 3A example, the appearance of the first virtual item is modified. In the FIG. 3B example the appearance of the second virtual item is modified. In each example this is indicated in the figure by shading, however modifying the appearance may comprise any one, or more, of changing the shape of the virtual item/space, changing the colour of the virtual item/space (for example changing the colour of at least one face of the virtual item or virtual space), displaying warning (e.g. a sound or a visual image) to a user.

In the FIG. 3A example the appearance of part of the first virtual representation is modified, for example part of the first virtual representation may be shown as red, red indicating an undesired configuration. In another example all of the first virtual representation may be modified.

In the FIG. 3B example the appearance of one face of the second virtual representation is modified, being the face that intersects the first virtual representation. In another example only part of the face may be modified. As the second virtual representation is a hollow space the first virtual representation is able to be moved through, e.g. translate, through the second virtual representation. As such, to avoid the undesirable configuration shown in FIGS. 3A and 3B, a user may move the first virtual representation to another configuration, one where it is inside the second virtual representation and does not intersect with any of its boundaries.

Still referring to FIGS. 3A and 3B, but with reference to FIGS. 2A and 2B it will be appreciated that one of the faces of the second virtual representation corresponds to the vehicle boot entry (e.g. the boot of the vehicle). This face is labelled in FIG. 3A as F1 and the second virtual representation shown in FIG. 3A has six faces F1, ..., F6, with each face corresponding to a real-world side of the vehicle boot space (202 in FIG. 2A). According to the labels shown in FIG. 3A, face F3 corresponds to the bottom of the boot space, face F5 corresponds to the bulkhead in the vehicle, face F6 corresponds to the roof of the boot space, faces F2 and F4 correspond to the sides of the boot space, and face F1 corresponds to the entrance to the boot space, e.g. following the opening of the boot. Face F1 may be designated as an entrance to the second virtual representation and hence as an entrance to the virtual space. In these examples, the first virtual representation may be permitted to pass through this face without the first and/or second representations changing or being modified. For example, the depicted change in the representation of the first virtual representation in FIG. 3A and the second virtual representation in FIG. 3B may not occur when the first virtual representation intersects the entrance face F1 of the second virtual representation, since the first virtual representation is allowed, or permitted, to pass through this entrance face without it being flagged to the user, as in the real-world this corresponds to a physical item moving through an entrance to a boot space, for example.

Figure 3C:
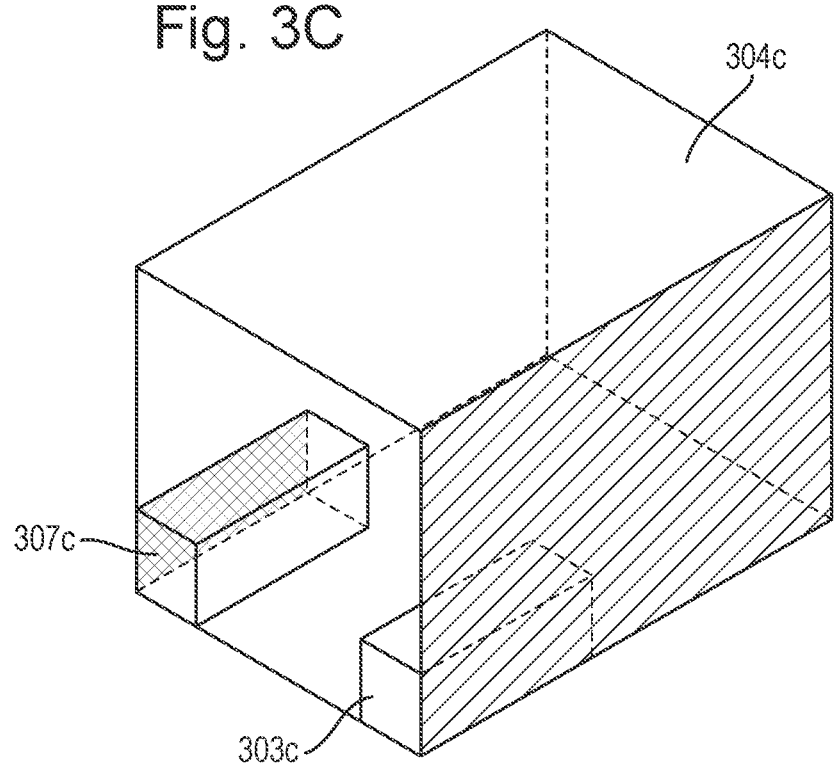
FIG. 3C is a schematic diagram of virtual environments showing a virtual representation of a physical item touching a nonpenetrable face or a virtual item.

FIG. 3C shows another example. In this example, the face F4 is designated as impenetrable and, if the virtual representation 303c of the physical item of luggage touches the face F4 of the virtual representation 304c of the real-world space, then the appearance of the face F4 (e.g. at least a portion of the virtual representation 304c) is modified. This example provides a visual indication to a user that the virtual item 303c is not able to be moved any further to the right of the virtual space 304c, which can assist the user in their virtual packing operation. In this example therefore, if the virtual representation of an item touches a face of the virtual representation of a real-world space then at least one of a portion of the virtual item or virtual real-world space is modified. In this example the touching face F4 has its appearance modified but in another example the virtual items appearance may be modified.

In this example, at least part of the virtual representation of the real-world space 304c (and, in this example specifically one of the faces, e.g. F4) is designated as not penetrable. In this example, rather than the virtual representation of the physical item 303c passing through the face F4 (As in the examples of FIGS. 3A and 3B), when it touches the face F4 the appearance of the face F4 is changed (e.g. highlighted or changed colour).

In another example, at least part of the virtual representation of the physical item 303c may be modified if it touches a nonpenetrable face, e.g. F4. For example, the face(s) of the virtual representation of the physical item 303c that are touching a face of the virtual representation of the real-world space may have its appearance modified. In other words, part of the virtual item touching the virtual real-world space may appear differently to indicate to the user that the virtual item touches a boundary of the real-world space. This is shown in by the virtual representation 307c of a physical item. In this case, the virtual item is touching the face F2 and the face of the virtual item touching F2 is highlighted (e.g. has its appearance changed). In the FIG. 3C example only part of the representation 307c is shown modified, but in another example all of the virtual representation 307c may be modified.

This example may have use in informing the user that a virtual item has touched the ceiling of the virtual space, indicating to the user that no further items can be provided above the virtual item, in other words, there is no space between the item and the real-world or virtual space.

Figure 3D:
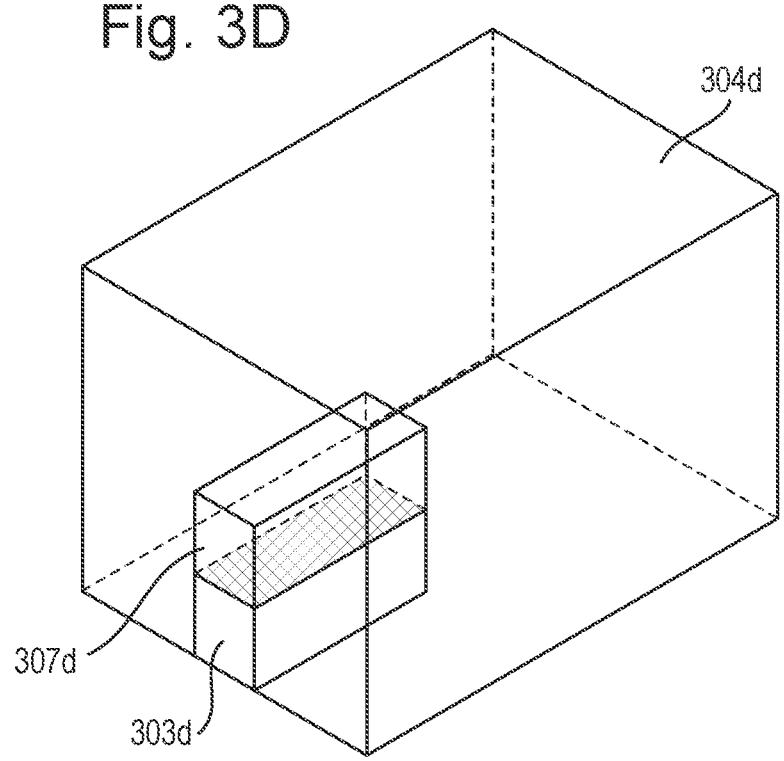
FIG. 3D is a schematic diagram of virtual environments showing a virtual representation of a physical item touching a nonpenetrable face or a virtual item.

FIG. 3D shows another example. In this example, two virtual representations 307d, 303d, each being a virtual representation of real-world physical item, are in a configuration where they are touching. In this example, virtual item 307d is stacked on top of virtual item 303d. In this example, the face of at least one of the virtual item's appearance is modified to indicate to the user that the items are touching. In one example, only the portion of the face of one virtual item that touches another item is modified to indicate to the user how the virtual items are stacked, e.g. where any "free space" lies. For example, if virtual item 307d were placed over half of virtual item 303d then the appearance of the overlapping half of virtual item 303d may be modified, which shows the user that half of the virtual item 303d is essentially available and another item may be stacked on this half.

Although shown in FIG. 3d when two virtual items are stacked on top of one another, this may also be performed when two virtual items are stacked side-by-side so that their sides touch. In this example, the appearance of at least one of the touching sides of the object may be modified to indicate to the user that the items are touching and therefore that the virtual items can't be moved relative to one another so as to create less space between them. This can also assist in indicating to the user that the most space-efficient distribution of items is achieved.

In other words, the example of FIG. 3D shows that the appearance of at least part of a virtual representation of a physical item may be modified when it is in contact with a virtual representation of another physical item.

Figure 4:
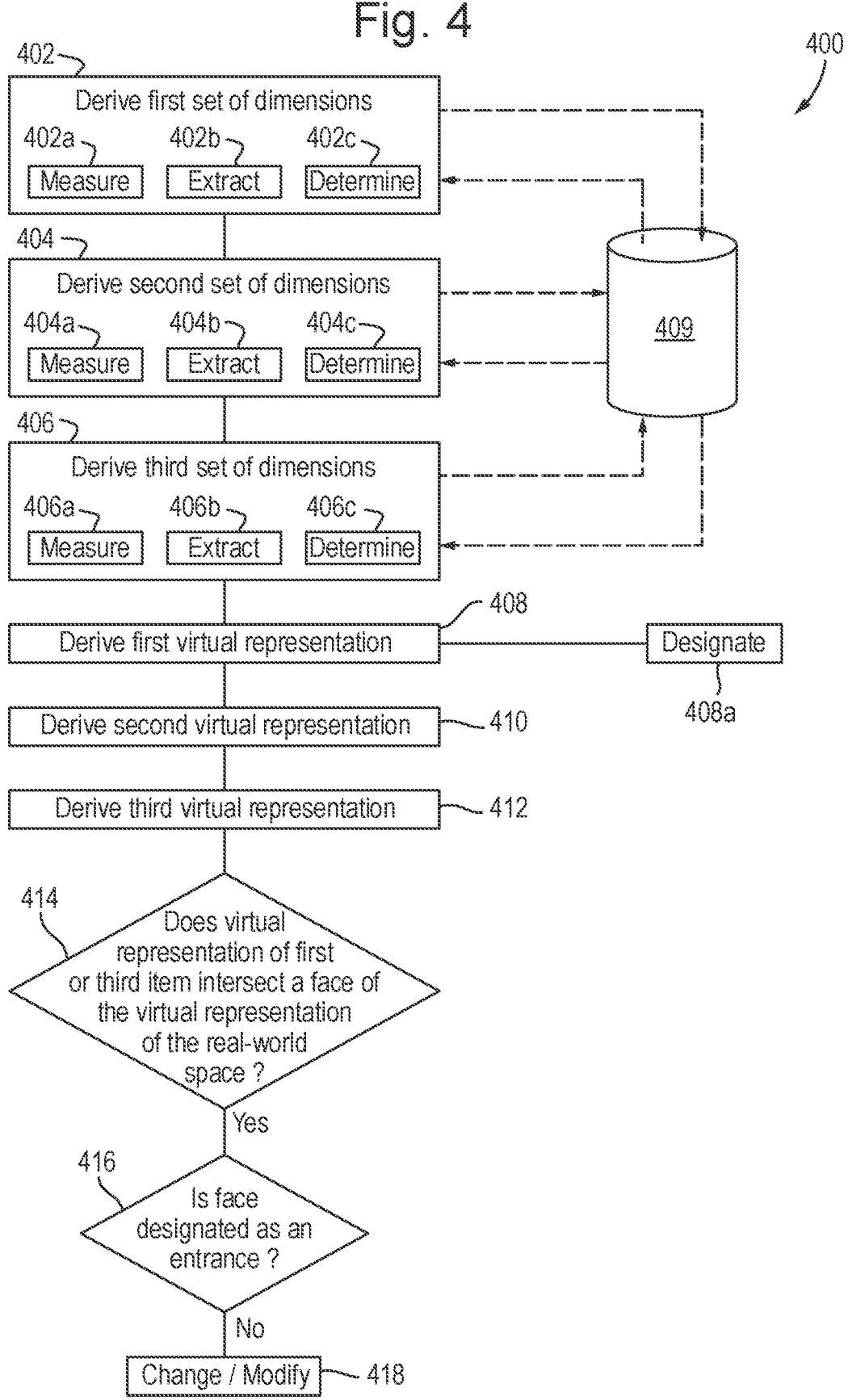
FIG. 4 is a flowchart of an example method.

FIG. 4 shows an example method 400 which may comprise a computer-implemented method and which may comprise a method of loading at least one item into a space, or a method of loading a plurality of items into a space. The method 400 may comprise the method 100.

At step 402 the method 400 comprises deriving a first set of dimensions corresponding to a real-world space, for example as discussed above with reference to block 102 of the method 100. At step 404 the method 400 comprises deriving a second set of dimensions corresponding to a first physical item in the real-world, for example as discussed above with reference to block 104 of the method 100. At block 406, the method 400 deriving a third set of dimensions, the third set of dimensions corresponding to a second physical item in the real-world. Therefore, the method 400 comprises deriving a plurality of sets of dimensions with each set of dimensions corresponding to a respective physical item in the real-world (e.g. that are to be placed in the real-world space).

As indicated by blocks 402a, 402b, 402c, 404a, 404b, 404c, 406a, 406b, and 406c, deriving the dimensions may comprise measuring, extracting, and/or determining, as discussed above. For example, the dimensions may be measured, e.g. by a processor implementing automatic measuring software, or extracted, e.g. from a database, or determined, e.g. from a representation (e.g. a picture) of a physical item or real-world space. As indicated by the dotted arrows deriving the dimensions may comprise extracting the dimensions from a database 409, in some examples. In other examples, once the dimensions have been derived they may be stored in the database 409, e.g. for later use. The database may store a set of dimensions for later extraction. The database may store a set of dimensions corresponding to a physical item differently, or in a different part of the database, to a set of dimensions corresponding to a real-world space. The database may store a set of dimensions together with metadata (e.g. classification metadata) that describes whether the dimensions corresponds to a real-world item or real-world space. In this way, when a set of dimensions are retrieved it can be determined whether those dimensions represent a physical item (in which case the associated virtual representation will comprise a solid object in the virtual environment) or a real-world space (in which case the associated virtual representation will comprise a hollow space in the virtual environment).

In other words, the database may comprise two distinct "containers", or parts, and virtual representations (e.g. the dimensions thereof) may be saved in one of these containers. One container may be for representations of "items" (which are to be depicted as solid objects) and another may be for representation of "spaces" (which are to be depicted as hollow spaces that the items can move through). A user is able to store a virtual representation (e.g. a set of dimensions that characterise the virtual representation) in either container in which it will be saved as, for example, ITEM 1, ITEM 2, . . . , or SPACE 1, SPACE 2, etc. This designation may be automatic. For example, where a user starts capturing (e.g. manually by tapping on their smartphone to designate the corners and/or the edges of an item or space as will be described later with reference to FIGS. 6*a-d* and 7*a-d*) before doing so a user may input that they are capturing the dimensions of an item or a space and, when captured, the dimensions may be stored in the appropriate container of the database. For example, the system may prevent captured dimensions for an "item" being saved as a "space". In this example, a user may click on a "vehicle boot space" icon (or "luggage" icon) before capturing the dimensions of a real-world boot space and, clicking on the "boot space" (or "luggage") icon may cause the dimensions to be stored in the "space" (or "item") part of the database (to then be represented as hollow (or solid) when retrieved).

At step 408 the method comprises deriving a virtual representation of the real-world space from the first set of dimensions in a virtual environment, for example as discussed above with respect to step 106 of the method 100. At step 410 the method comprises deriving a virtual representation of the first physical item in the virtual environment, for example as discussed above with respect to step 108 of the method 100. At step 412 the method comprises deriving a virtual representation of the second physical item in the virtual environment (for example as discussed above with respect to step 108 of the method 100 but for a different real-world physical item). Therefore, steps 410 and 412 of the method 400 comprise deriving a plurality of virtual representations, each representation being of a physical item in the real-world. As described above, the virtual representation of the real-world space may comprise a number of faces bounding a three-dimensional virtual volume. As indicated by step 408*a*, step 408 may comprise designating one of those faces to be the virtual entrance to the virtual volume. This may be done automatically. The designated "entrance face" may correspond to a real-world entrance to the real-world volume.

At step 414 the method determines whether the virtual representation of the first and/or second physical item intersects the virtual representation of the real-world space. For example, as described above, the virtual representation of the real-world space may comprise a number of faces bounding a three-dimensional virtual volume, and step 414 may determine whether the virtual representation of the first and/or second physical item intersects one of the faces of the virtual representation of the real-world space.

The virtual volume that is the virtual representation of the real-world space may occupy a number of virtual three-dimensional coordinates (e.g. (x,y,z) coordinates in the three-dimensional virtual space). Each associated face of the virtual volume may therefore have a set of coordinates that define the face. The virtual representation of a physical item may also have associated coordinates in the virtual environment and when at least one coordinate of the coordinates of the virtual representation of the physical item are the same as at least one coordinate of the coordinates of the virtual representation of the real-world space then it may be determined that the virtual item intersects a face of the virtual space. In other words, step 414 may comprise determining whether at least one coordinate of the coordinates of the virtual representation of the physical item are the same as at least one coordinate of the coordinates of the virtual representation of the real-world space At step 416 it is determined whether the face that is intersected by the first and/or second physical item is the face that is designated to be the entrance to the virtual representation of the real-world space and, if it is not the face designated as the entrance, then the method proceeds to step 418 at which the appearance of the virtual representation of the real-world space and/or the virtual representation of whichever one, or both, of the first and second physical items is modified or changed, e.g. as described above, to provide a visual indication to a user that the depicted configuration is not achievable in the real-world. Step 416 may comprise determining whether the coordinates of the face that interests the virtual item is designated as an entrance. Designating the face may comprise designating at least one coordinate defining the face.

Figure 5A:
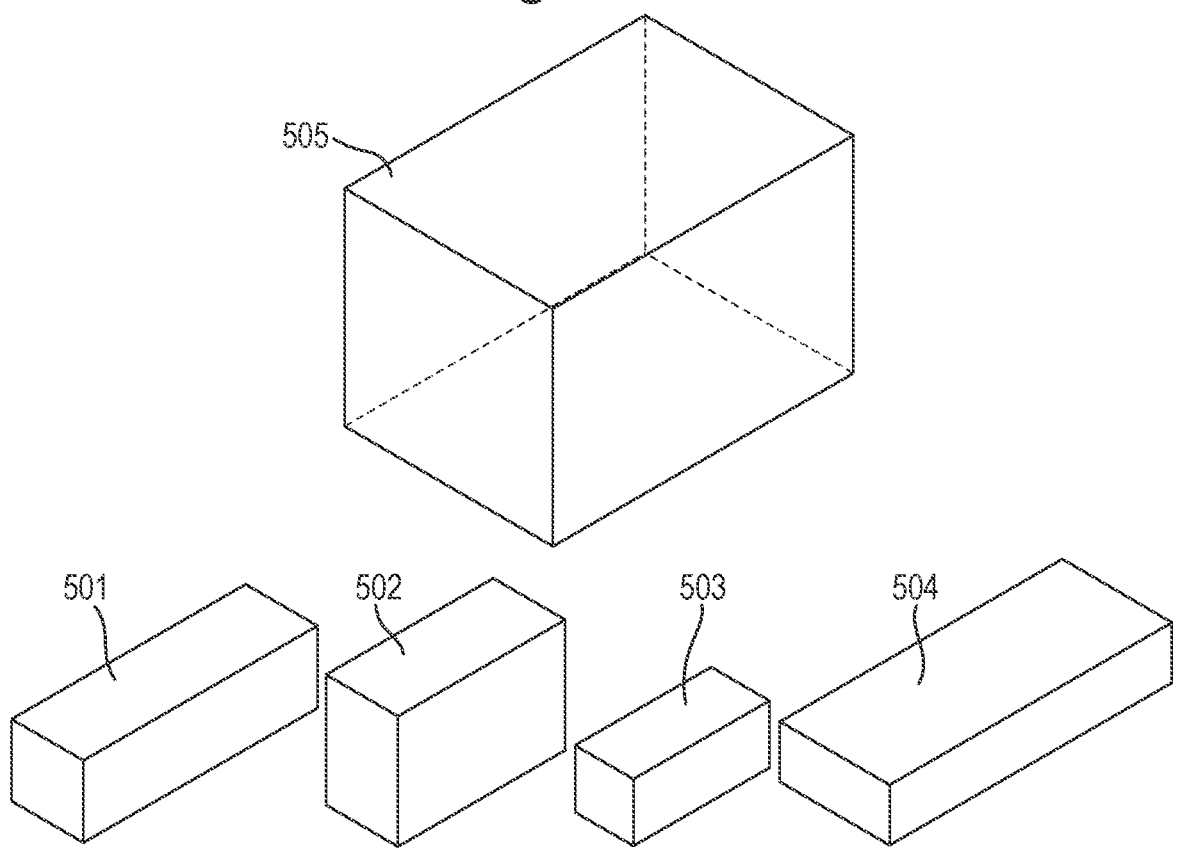
FIG. 5A is a schematic diagram of virtual environments showing virtual representations of a plurality of items to be stored in a virtual representation of a real-world space.
Figure 5B:
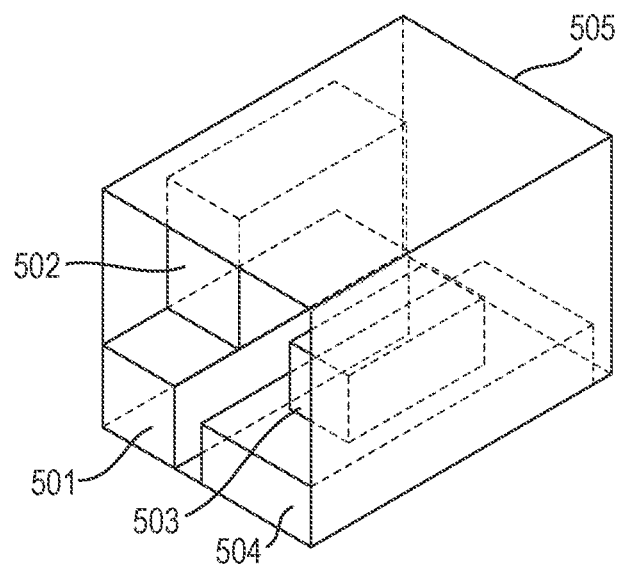
FIG. 5B is a schematic diagram of virtual environments showing virtual representations of a plurality of items to be stored in a virtual representation of a real-world space.

FIGS. 5*a* and 5*b* show an example virtual environment where four virtual objects (e.g. virtual representations of physical items) 501-504 are depicted with a virtual space (e.g. a virtual representation of a real-world space) 505. In FIG. 5*a* each virtual representation of each physical item is shown remote from the virtual representation of the real-world space, which may correspond to a configuration of the physical items in the real-world—for example, a user may be looking at four physical items (to which the virtual representations 501-504 correspond) and considering how best to fit them into a real-world space (to which the representation 505 corresponds), e.g. how to best fit four items of luggage into a vehicle boot space.

FIG. 5*b* shows the virtual environment where the plurality of virtual representations 501-504 are fit into the virtual space 505. To arrive at the FIG. 5*b* configuration a user may have individually moved each virtual representation 501-504 into the virtual space 505 in the configuration shown in FIG. 5*b*. The user may have rotated one of the virtual representations 501-504 to arrive at the configuration shown in FIG. 5*b*. Each virtual representation 501-504 is therefore user-manipulatable, user-rotatable, user-translatable (e.g. in an out of the virtual space 505). In another example, the FIG. 5*b* configuration may be the result of implementing, e.g. by a processor, an automatic packing algorithm which may include an optimisation algorithm. For example, a processor may be configured to move the virtual representations 501-504 into the virtual space 505 in such a way to optimise a given parameter. For example, the parameter may be related to a weight distribution (e.g. an optimum weight distribution) or the parameter may be related to a maximum number of items that can fit into the space. For example, if there are over the maximum number of items that can fit into the space then a processor may be configured to move the virtual representations of a subset of a plurality of items into the virtual space so that the subset represents the maximum number of the plurality of items that can fit into the virtual space. A user may then adopt that configuration in the real-world. Of course, in other examples the configuration may be completely determined by a user.

FIGS. 6A-6D and FIGS. 7A-7D respectively show one example of deriving a virtual representation of a physical item 600 and a real-world space 700.

Figure 6A:
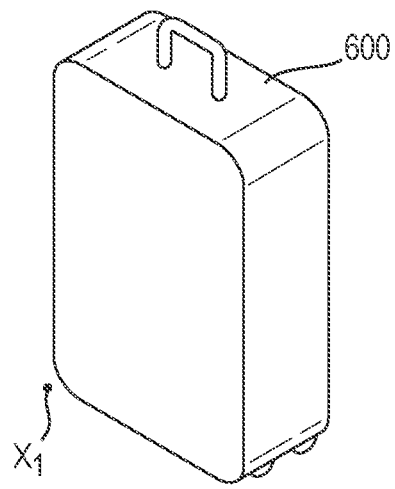
FIG. 6A is a schematic diagram of a process of obtaining a set of dimensions and/or a virtual representation of a physical item.
Figure 6B:
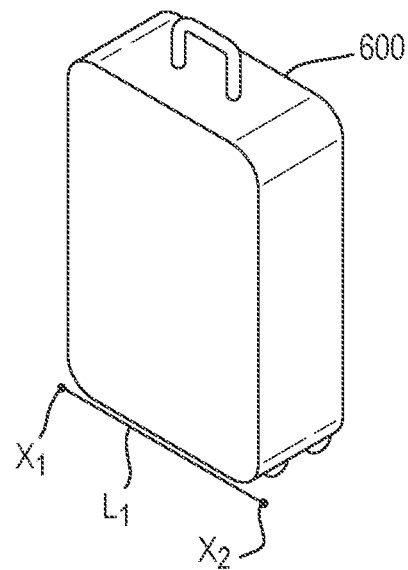
FIG. 6B is a schematic diagram of a process of obtaining a set of dimensions and/or a virtual representation of a physical item.
Figure 6C:
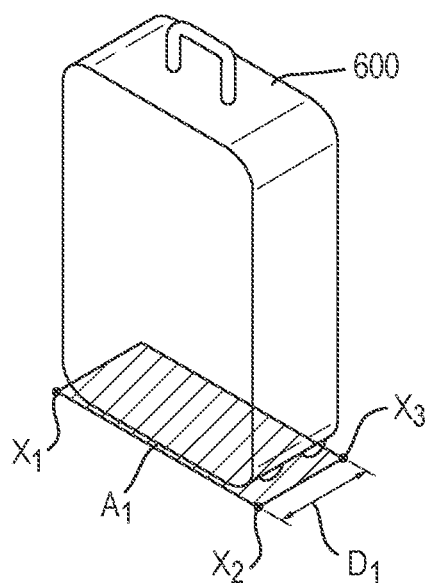
FIG. 6C is a schematic diagram of a process of obtaining a set of dimensions and/or a virtual representation of a physical item.

FIGS. 6A-6D show a physical item 600 which is shown for example purposes only as an item of luggage. FIGS. 6A-6D show an example way of deriving a set of dimensions that correspond to the real-world dimensions of the item 600 and/or the virtual representation of the item 600. To derive the a set of dimensions that correspond to the real-world dimensions of the item 600 (not labelled) and/or the virtual representation of the item 600, a first position X1 may be selected (FIG. 6A). Then, a second position X2 may be selected (FIG. 6B). This defines a one-dimensional line L1 between the two positions X1 and X2. The first position X1 may be selected such that it is at one extremum of the item, e.g. a first extreme point, e.g. an extremum of one of its dimensions, e.g. at a corner of an item. In this example, the first position X1 is selected to be approximately at the lower-front-left-most corner. The second position X2 may be selected such that it is at another extremum of the item, e.g. a second extreme point, e.g. an extremum of one of its dimensions, e.g. at a corner of an item. In this example, the second position X2 is selected to be approximately at the lower-front-right-most corner of the item. The line L1 is therefore a virtual dimension that corresponds to the real-world width w1 (with reference to FIG. 2) of the item 600.

Then (FIG. 6C), a third position X3 may be selected. This defines a two-dimensional area A1 between the three positions X1, X2, and X3. The third position X3 may be selected such that it is at one extremum of the item, e.g. a third extreme point, e.g. an extremum of one of its dimensions, e.g. at a corner of an item. In this example, the third position X3 is selected to be approximately at the lower-rear-right-most corner. This also defines another virtual dimension D1, being the line connecting points X2 and X3, being a virtual dimension that corresponds to the real-world depth d1 (with reference to FIG. 2) of the item 600. Then (FIG. 6D), a fourth position X4 may be selected. This defines a three-dimensional volume V1 between the three positions X1, X2, X3, and X4. The fourth position X4 may be selected such that it is at one extremum of the item, e.g. a fourth extreme point, e.g. an extremum of one of its dimensions, e.g. at a corner of an item. In this example, the fourth position X4 is selected to be approximately at the upper-rear-left-most corner. This also defines another virtual dimension H1, being a virtual dimension that corresponds to the real-world height h1 (with reference to FIG. 2) of the item 600.

Figure 6D:
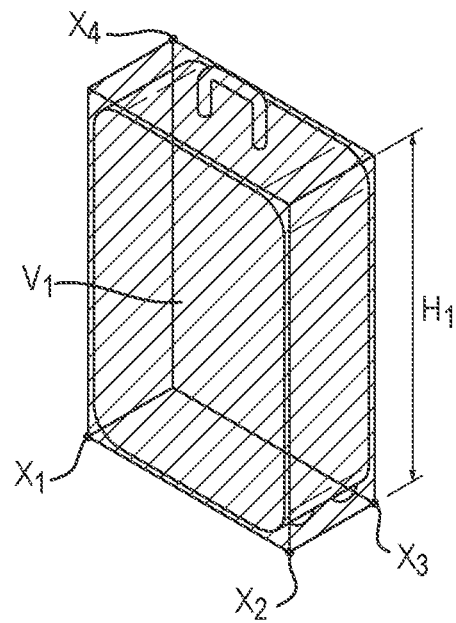
FIG. 6D is a schematic diagram of a process of obtaining a set of dimensions and/or a virtual representation of a physical item.

The three-dimensional volume spanned by the four points X1, X2, X3, and X4—V1 in FIG. 6D—may be the virtual representation of the physical item 600. In other words, the virtual representation of the physical item 600 may comprise the three-dimensional volume V1 as shown in FIG. 6D. The virtual volume V1 may be defined automatically, e.g. by a processor or a computer implementing a computer program, or may be defined manually by a user. In this latter example, a user may be viewing the item of luggage 600 through a camera (such as via the camera on a smart device such as a smart phone) and may manually designate the positions X1-X4 by tapping on the screen of the smart device and/or by dragging their finger from one point on the screen to another to define the positions. In another example, a user may view the item 600 through a camera and software may be automatically derive the representation by the process described above (e.g. automatically designating the first position, second position, line, etc.).

Figure 7A:
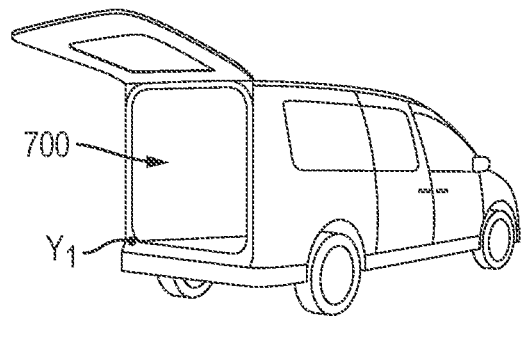
FIG. 7A is a schematic diagram of a process of obtaining a set of dimensions and/or a virtual representation of a real-world space.
Figure 7B:
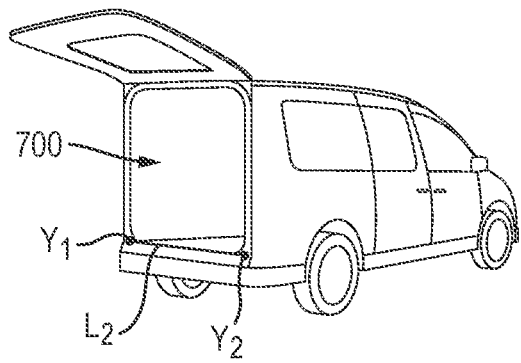
FIG. 7B is a schematic diagram of a process of obtaining a set of dimensions and/or a virtual representation of a real-world space.
Figure 7C:
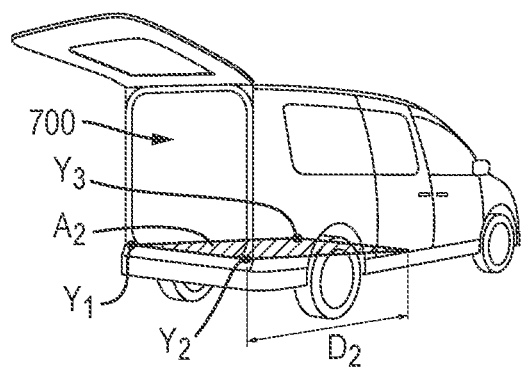
FIG. 7C is a schematic diagram of a process of obtaining a set of dimensions and/or a virtual representation of a real-world space.

FIGS. 7A-7D show a physical item 700 which is shown for example purposes only as an vehicle boot space. FIGS. 7A-7D show an example way of deriving a set of dimensions that correspond to the real-world dimensions of the real-world space 700 and/or the virtual representation of the space 700. To derive the a set of dimensions that correspond to the real-world dimensions of the real-world space 700 (not labelled) and/or the virtual representation of the space 700, a first position Y1 may be selected (FIG. 7A). Then, a second position Y2 may be selected (FIG. 7B). This defines a one-dimensional line L2 between the two positions Y1 and Y2. The first position Y1 may be selected such that it is at one extremum of the item, e.g. a first extreme point, e.g. an extremum of one of its dimensions, e.g. at a corner of an item. In this example, the first position Y1 is selected to be approximately at the lower-front-left-most corner. The second position Y2 may be selected such that it is at another extremum of the item, e.g. a second extreme point, e.g. an extremum of one of its dimensions, e.g. at a corner of an item. In this example, the second position Y2 is selected to be approximately at the lower-front-right-most corner of the item. The line L2 is therefore a virtual dimension that corresponds to the real-world width w2 (with reference to FIG. 2) of the space 700.

Then (FIG. 7C), a third position Y3 may be selected. This defines a two-dimensional area A2 between the three positions Y1, Y2, and Y3. The third position Y3 may be selected such that it is at one extremum of the item, e.g. a third extreme point, e.g. an extremum of one of its dimensions, e.g. at a corner of an item. In this example, the third position Y3 is selected to be approximately at the lower-rear-left-most corner. This also defines another virtual dimension D2, being the line connecting points X1 and X3, being a virtual dimension that corresponds to the real-world depth d2 (with reference to FIG. 2) of the space 700. Then (FIG. 6D), a fourth position Y4 may be selected. This defines a three-dimensional volume V2 between the three positions Y1, Y2, Y3, and Y4. The fourth position Y4 may be selected such that it is at one extremum of the item, e.g. a fourth extreme point, e.g. an extremum of one of its dimensions, e.g. at a corner of an item. In this example, the fourth position Y4 is selected to be approximately at the upper-front-left-most corner. This also defines another virtual dimension H2, being a virtual dimension that corresponds to the real-world height h2 (with reference to FIG. 2) of the space 700.

Figure 7D:
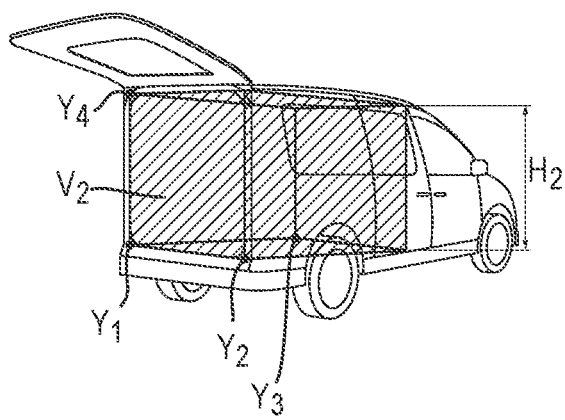
FIG. 7D is a schematic diagram of a process of obtaining a set of dimensions and/or a virtual representation of a real-world space.

The three-dimensional volume spanned by the four points Y1, Y2, Y3, and Y4—V2 in FIG. 7D—may be the virtual representation of the real-world space 700. In other words, the virtual representation of the real-world space 700 may comprise the three-dimensional volume V2 as shown in FIG. 7D. The virtual volume V2 may be defined automatically, e.g. by a processor or a computer implementing a computer program, or may be defined manually by a user. In this latter example, a user may be viewing the vehicle boot space 700 through a camera (such as via the camera on a smart device such as a smart phone) and may manually designate the positions Y1-Y4 by tapping on the screen of the smart device and/or by dragging their finger from one point on the screen to another to define the positions. In another example, a user may view the space 700 through a camera and software may be automatically derive the representation by the process described above (e.g. automatically designating the first position, second position, line, etc.)

Referring again to FIG. 4, the dotted arrows indicate that storage, or retrieval, of the first set of dimensions for a first item, second item, or real-world space. In examples where a set of dimensions is stored, the dimensions L1, D1, H1 (with reference to FIG. 6) or L2, D2, H2 (with reference to FIG. 7) may be stored in the database. As stated above, a set of dimensions may be stored with an associated tag designating the dimensions as "item" (to be represented virtually as solid) or as "space" (to be represented as hollow). To build the virtual representation of the item or space, the three-dimensional volume V1, or V2, may be built from these dimensions, either prior to or after their storage. In examples where a set of dimensions is retrieved, the dimensions L1, D1, H1 (with reference to FIG. 6) or L2, D2, H2 (with reference to FIG. 7) may be retrieved from the database. Again, to build the virtual representation of the item or space, the three-dimensional volume V1, or V2, may be built from these dimensions following their retrieval. The retrieval of a set of dimensions may comprise the reading of the associated tag to determine whether the dimensions relate to an "item" or to a "space". In either example, when building the virtual representation metadata describing the classification of a set of dimensions as "item" or "space" may be checked and, if the set of dimensions is tagged as "item" then the virtual representation may be built from the dimensions as a solid object and, if the set of dimensions is tagged as a "space" the virtual representation may be built from the dimensions as a hollow space. Where a set of dimensions is tagged as "space" building the virtual representation may comprise designating one face of the virtual volume as the "entrance"—e.g. designating the face of the volume V2, shown in FIG. 7D, that corresponds to the vehicle boot as the entrance to the volume V2.

Deriving a representation (e.g. blocks 408, 410, 412) of the method 400 of FIG. 4, may comprise building the representation—for example in the way as described above with reference to FIGS. 6A-6D (for an item) and FIGS. 7A-7D (for a space). Deriving a representation may comprise retrieving associated dimensions. Deriving the dimensions may be performed concurrently with deriving the representation of the item or space having the dimensions. In other words, steps 402 and 408 may be performed concurrently, steps 404, and 410 may be performed concurrently, and steps 406 and 412 may be performed concurrently. Steps 401, 404, 406, 408, 410, 412 may be performed concurrently. Step 408a may be performed concurrently with step 408.

In this way, known dimensions for types of items and/or spaces may be stored in the database (e.g. as CAD data) and may then be retrieved to create the virtual representation. In this way to create a virtual representation a user may not need to measure an item or space (e.g. may not need to derive the dimensions themselves) but can access a database of stored dimensions for unmeasured items or spaces.

This effectively allows a user to determine whether certain items fit in certain spaces without actually possessing them, or even being in proximity to them. For example, as a theoretical exercise a user may download data relating to a number of boxes (e.g. containing items that the user is intending to purchase) and to download data relating to the vehicle boot space of a vehicle that the user does not have (e.g. they own the vehicle but it's at another, remote, location or they do not own the vehicle at all) and build a virtual representation of each box and the vehicle boot space. The user may then virtually determine whether, and how, the boxes may fit into the boot space. In these examples the dimensions of the boxes may be downloaded, or otherwise obtained, from a store selling the products and the dimensions of the boot space may be downloaded, or otherwise obtained, from the manufacturer of the vehicle.

In yet another example, the dimensions may be manually entered by a user. For example, the user may manually measure the dimensions of an item and/or a space (e.g. using a tape measure or any other suitable measuring means) and may then input the measured dimensions to derive the virtual representation of the item and/or space. In other examples the use may real the dimensions of an item or space (e.g. from a list or read off of packaging) and manually enter those dimensions to derive the virtual representation.

Figure 8:
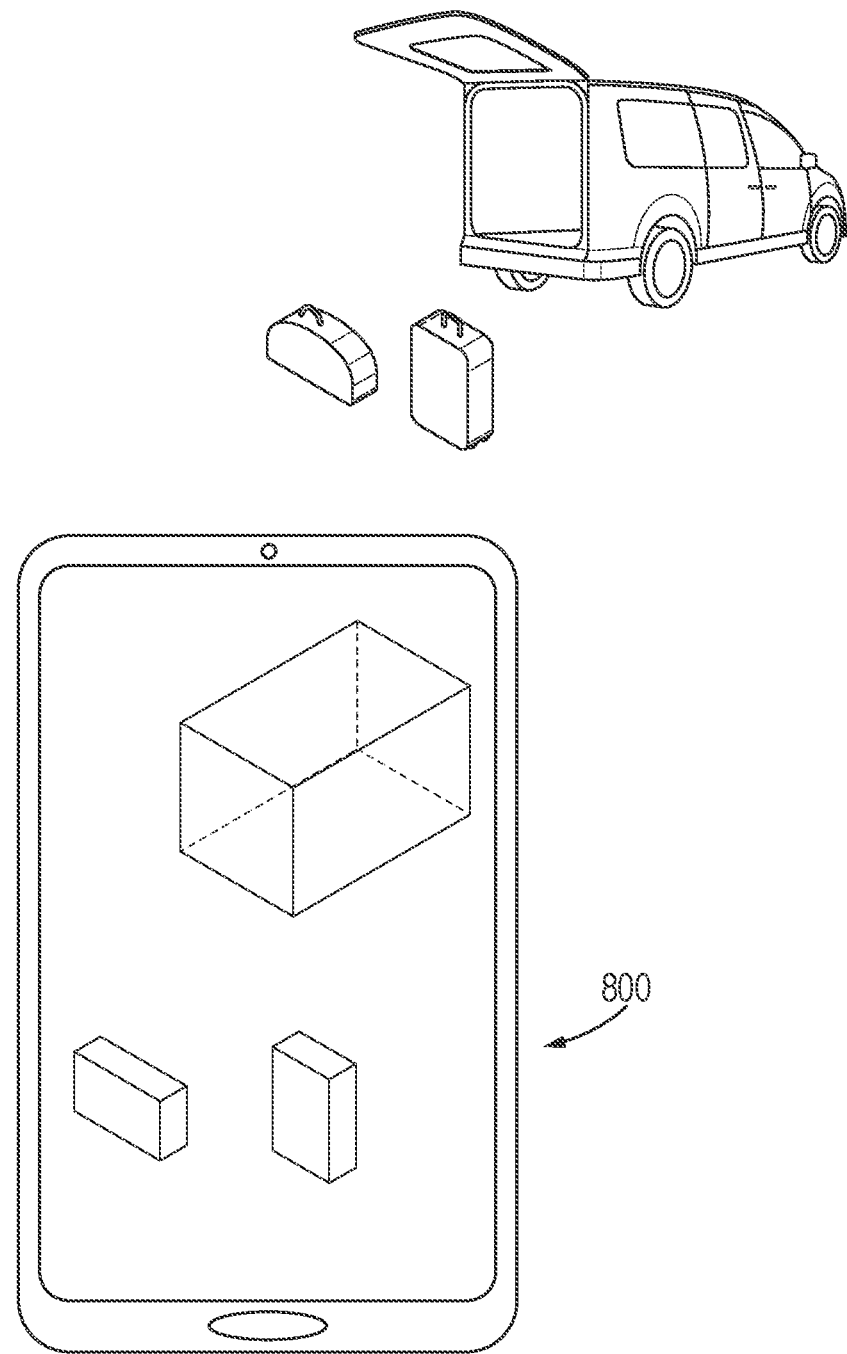
FIG. 8 is a schematic diagram of a real-world packing operation comprising a plurality of items to be stored in a real-world space and device, showing a virtual environment, for the assistance of the user in the packing operation.

FIG. 8 shows an example implementation 800 of some of the examples described above. FIG. 8 shows a smart device 800 that comprises a computer program that when executed on the smart device causes the smart device to implement the method 100 or 400 as described above. The smart device 800 may comprise a processor and/or a machine-readable medium having instructions stored thereon that, when executed by the processor of the smart device, causes the smart device to implement the method 100 or 400 as described above.

FIG. 9 shows an example non-transitory and machine-readable medium 902 in associated with a processor 904. The medium 902 comprises a set of instructions 906 stored thereon which, when executed by the processor 904 cause the processor 904 to perform a series of tasks. For example, the instructions 906, when executed by the processor 904, may cause the processor 904 to perform any one, or a combination of, the steps of the example methods 100 or 400.

Examples may be provided according to any one of the following numbered statements.

Statement 1. A method comprising:
deriving a first set of dimensions corresponding to a real-world space;
deriving a second set of dimensions corresponding to a first physical item in the real-world;
deriving a virtual representation of the real-world space from the first set of dimensions in a virtual environment;
deriving a virtual representation of the first physical item from the second set of dimensions in the virtual environment;
wherein the virtual representation of the real-world space is represented as a hollow space, and wherein the virtual representation of the first physical item is represented as a solid item that is user-manipulatable within the virtual environment and the virtual representation of the real-world space, for example such that the virtual representation of the first physical item is moveable through the boundaries of the virtual representation of the real-world space, for example enabling a user to determine whether and/or how the first physical item can fit in the real-world space by manipulating the virtual representation of the first physical item in the virtual representation of the real-world space.

Statement 2. A method according to Statement 1, wherein, if the virtual representation of the first physical item intersects with a boundary of the virtual representation of the real-world space, the method further comprises:
changing the virtual representation of at least one of the first physical item and the boundary intersecting the first physical item.

Statement 3. A method according to Statement 2, wherein changing the visual representation comprises:
modifying the appearance of the visual representation of the first physical item or the boundary of the virtual representation of the real-world space that intersects with the virtual representation of the first physical item.

Statement 4. A method according to any preceding Statement wherein
deriving the first and/or second set of dimensions comprises at least one of: measuring the real-world dimensions of the real-world space and/or the first physical item, extracting the real-world dimensions of the real-world space and/or the first physical item form a dataset; and determining the real-world dimensions of the real-world space and/or the first physical item Statement 4. A method according to any preceding Statement, further comprising:
placing the virtual representation of the first physical item in the virtual representation of the real-world space.

Statement 5. A method according to Statement 4, further comprising:
instructing a user to place the first physical item in the real-world space according to the virtual configuration of the virtual representation of the first physical item being in the virtual representation of the real-world space.

Statement 6. A method according to any preceding Statement, further comprising:
  deriving a third set of dimensions corresponding to a second physical item;
  deriving a virtual representation of the second physical item from the third set of dimensions in the virtual environment wherein the virtual representation of the second physical item is represented as a solid item that is user-manipulatable within the virtual environment and the virtual space.

Statement 7. A method according to Statement 6, wherein the virtual representations of the first physical item and second physical item are not permitted to at least one of: pass through, overly, overlay, clash, and mesh.

Statement 8. A method according to Statement 6 or 7, wherein, if the virtual representation of the second physical item intersects with a boundary of the virtual representation of the real-world space, the method further comprises:
  changing the virtual representation of at least one of the second physical item and the boundary intersecting the first physical item, which may further comprise:
  modifying the appearance of the visual representation of the second physical item or the boundary of the virtual representation of the real-world space that intersects with the virtual representation of the second physical item.

Statement 9. A method according to any of Statements 6-8, further comprising:
  arranging (e.g. automatically arranging, e.g. by a processor or control unit) the virtual representations of the first and second physical items so that both items fit within the virtual representation of the real-world space.

Statement 10. A method according to any preceding Statement wherein, to derive a set of dimensions, the method further comprises:
  selecting a first position;
  selecting a second position to define a one-dimensional line between the first and second positions;
  selecting a third position to define a two-dimensional area spanned by the first, second, and third position; and
  selecting a fourth position to define a three-dimensional volume spanned by the first, second, third, and fourth positions, the three-dimensional volume being the virtual representation of the first or second physical item or real-world space (e.g. the line between the first and second positions defines a virtual width, the line between the first or second and third positions defines a virtual length and the line between the first, second, or third, positions and the fourth position defines a virtual depth).

Statement 11. A method according to any preceding Statement, further comprising at least one of: storing real-world dimensions in a database, and storing virtual dimensions, corresponding to real-world dimensions, in a database.

Statement 12. A method according to any preceding Statement, further comprising:
  storing at least one of the first set of dimensions, the second set of dimensions, the third set of dimensions, the virtual representation of the first physical item, the virtual representation of the real-world space, and the virtual representation of the second physical item, in a database.

Statement 13. A method according to any preceding Statement, wherein the virtual representation of the first item and/or the representation of the second physical item is not permitted to cross a virtual boundary of the virtual representation of the real-world space.

Statement 14. A method according to Statement 13, wherein the virtual representation of the real-world space comprises a number of bounding faces, each face representing a boundary of the virtual space, with one of those faces being an entrance to the virtual space, the virtual representation of the first item and/or the virtual representation of the second physical item being movable through this face but not the other faces.

Statement 15. A method according to Statement 13 wherein a user is able to designate the face representing the entrance to the virtual space.

Statement 16. A method of building a virtual environment, the method comprising:
  creating a virtual representation of an item in a virtual environment, and
  creating a virtual representation of a three-dimensional space in the virtual environment,
wherein the virtual representation of the item is user-manipulatable within the virtual representation of the three-dimensional space such that a user is able to determine whether the virtual representation of the item is able to fit within the virtual representation of the three-dimensional space.

Statement 17. A controller for a vehicle, the controller being configured to perform the method according to any one of Statements 1-16.

Statement 18. A non-transitory computer-readable medium having instructions stored thereon wherein the instructions, when executed by a processor, cause the processor to:
  derive a first set of dimensions corresponding to a real-world space;
  derive a second set of dimensions corresponding to a first physical item in the real-world;
  derive a virtual representation of the real-world space from the first set of dimensions in a virtual environment;
  derive a virtual representation of the first physical item from the second set of dimensions in the virtual environment;
wherein the virtual representation of the real-world space is represented as a hollow space, and wherein the virtual representation of the first physical item is represented as a solid item that is user-manipulatable within the virtual environment and the virtual representation of the real-world space, for example such that the virtual representation of the first physical item is moveable through the boundaries of the virtual representation of the real-world space, for example enabling a user to determine whether and/or how the first physical item can fit in the real-world space by manipulating the virtual representation of the first physical item in the virtual representation of the real-world space.

Statement 19. A non-transitory computer-readable medium according to Statement 18, wherein the instructions, when executed by a processor, cause the processor to:
  change the virtual representation of at least one of the first physical item and the boundary intersecting the first physical item if the virtual representation of the first physical item intersects with a boundary of the virtual representation of the real-world space.

Statement 20. A non-transitory computer-readable medium according to Statement 19, wherein, to change the representation, the instructions, when executed by a processor, cause the processor to:

modify the appearance of the visual representation of the first physical item or the boundary of the virtual representation of the real-world space that intersects with the virtual representation of the first physical item.

Statement 21. A non-transitory computer-readable medium according to any of Statements 18 or 19 wherein, to derive the first and/or second set of dimensions, the instructions, when executed by a processor, cause the processor to at least one of:
measure the real-world dimensions of the real-world space and/or the first physical item, extract the real-world dimensions of the real-world space and/or the first physical item form a dataset; and determine the real-world dimensions of the real-world space and/or the first physical item Statement 22. A non-transitory computer-readable medium according to any of Statements 18-21, wherein the instructions, when executed by a processor, cause the processor to:
place the virtual representation of the first physical item in the virtual representation of the real-world space.

Statement 23. A non-transitory computer-readable medium according to Statement 21, wherein the instructions, when executed by a processor, cause the processor to:
instruct a user to place the first physical item in the real-world space according to the virtual configuration of the virtual representation of the first physical item being in the virtual representation of the real-world space.

Statement 24. A non-transitory computer-readable medium according to any of Statements 18-23, wherein the instructions, when executed by a processor, are to cause the processor to:
derive a third set of dimensions corresponding to a second physical item;
derive a virtual representation of the second physical item from the third set of dimensions in the virtual environment wherein the virtual representation of the second physical item is represented as a solid item that is user-manipulatable within the virtual environment and the virtual space.

Statement 25. A non-transitory computer-readable medium according to Statement 24, wherein the instructions, when executed by a processor, cause the processor to derive the virtual representations of the first physical item and second physical item such that they are not permitted to at least one of: pass through, overly, overlay, clash, and mesh.

Statement 26. A non-transitory computer-readable medium according to Statement 24 or 25, wherein, the instructions, when executed by a processor, cause the processor to:
change the virtual representation of at least one of the first physical item, the second physical item and a boundary of the virtual representation of the real-world space, if the virtual representation of the first or second physical item, respectively, intersects with the boundary.

Statement 27. A non-transitory computer-readable medium according to Statement 26, wherein the instructions, when executed by a processor, cause the processor to:
modify the appearance of the visual representation of the first physical item or the boundary of the virtual representation of the real-world space that intersects with the virtual representation of the first physical item if the virtual representation of the second physical item intersects with a boundary of the virtual representation of the real-world space.

Statement 28. A non-transitory computer-readable medium according to any of Statements 24-27, wherein the instructions, when executed by a processor, cause the processor to:
arrange the virtual representations of the first and second physical items so that both items fit within the virtual representation of the real-world space.

Statement 29. A non-transitory computer-readable medium according to any of Statements 18-28 wherein, to derive a set of dimensions, the instructions, when executed by a processor, cause the processor to:
select a first position;
select a second position to define a one-dimensional line between the first and second positions;
select a third position to define a two-dimensional area spanned by the first, second, and third position; and
select a fourth position to define a three-dimensional volume spanned by the first, second, third, and fourth positions, the three-dimensional volume being the virtual representation of the first or second physical item or real-world space (e.g. the line between the first and second positions defines a virtual width, the line between the first or second and third positions defines a virtual length and the line between the first, second, or third, positions and the fourth position defines a virtual depth).

Statement 30. A non-transitory computer-readable medium according to any of Statements 18-29, wherein the instructions, when executed by a processor, cause the processor to at least one of: store real-world dimensions in a database, and store virtual dimensions, corresponding to real-world dimensions in a database.

Statement 31. A non-transitory computer-readable medium according to any of Statements 18-30, wherein the instructions, when executed by a processor, cause the processor to:
store at least one of the first set of dimensions, the second set of dimensions, the third set of dimensions, the virtual representation of the first physical item, the virtual representation of the real-world space, and the virtual representation of the second physical item, in a database.

Statement 32. A non-transitory computer-readable medium according to any of Statements 18-31, wherein the virtual representation of the first item and/or the representation of the second physical item is not permitted to cross a virtual boundary of the virtual representation of the real-world space.

Statement 33. A non-transitory computer-readable medium according to Statement 32, wherein the virtual representation of the real-world space comprises a number of bounding faces, each face representing a boundary of the virtual space, with one of those faces being an entrance to the virtual space, the virtual representation of the first item and/or the virtual representation of the second physical item being movable through this face but not the other faces.

Statement 34. A non-transitory and machine-readable medium having instructions stored thereon wherein the instructions, when executed by a processor, cause the processor to:
create a virtual representation of an item in a virtual environment, and
create a virtual representation of a three-dimensional space in the virtual environment,
wherein the virtual representation of the item is user-manipulatable within the virtual representation of the three-dimensional space such that a user is able to determine whether the virtual representation of the item is able to fit within the virtual representation of the three-dimensional space.

While the present disclosure has been illustrated and described in detail in the drawings and foregoing description, such illustration and description are to be considered illustrative or exemplary and not restrictive; the invention is not limited to the disclosed embodiments. Various alternative examples are discussed through the detailed description. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A computer comprising a processor and a non-transitory medium storing instructions executable by the processor to:
    derive a first set of dimensions corresponding to a real-world space;
    derive a second set of dimensions corresponding to a first physical item in the real-world;
    derive a third set of dimensions corresponding to a second physical item;
    derive a virtual representation of the real-world space from the first set of dimensions in a virtual environment, the virtual representation of the real-world space represented as a hollow space;
    derive a virtual representation of the first physical item from the second set of dimensions in the virtual environment, the virtual representation of the first physical item represented as a solid item that is user-manipulatable within the virtual environment and the virtual representation of the real-world space;
    derive a virtual representation of the second physical item from the third set of dimensions in the virtual environment, the virtual representation of the second physical item represented as a solid item that is user-manipulatable within the virtual environment and the virtual space; and
    not permit the virtual representations of the first and second physical items to pass through one another.

2. The computer of claim 1, wherein the instructions include instructions to instruct a user to place the first physical item in the real-world space according to a virtual configuration of the virtual representation of the first physical item in the virtual representation of the real-world space.

3. The computer of claim 1, wherein the instructions include instructions to, if the virtual representation of the first physical item intersects with a boundary of the virtual representation of the real-world space, modify the virtual representation of at least one of the first physical item and the boundary intersecting the first physical item.

4. The computer of claim 1, wherein the virtual representation of the real-world space comprises a number of bounding faces defining the hollow space as a three-dimensional volume therebetween bounded by the bounding faces, wherein each face represents a boundary of the virtual representation of the real-world space, and wherein at least one of the bounding faces represents an entrance to the virtual representation of the real-world space, and wherein the instructions include instruction to, if the virtual representation of the first physical item intersects with a bounding face of the virtual representation of the real-world space, modify the virtual representation of at least one of the first physical item and the bounding face intersecting the first physical item, unless the bounding face is the entrance to the virtual representation in which case the appearance of the virtual representation of a physical item and/or the virtual representation of the real-world space is not modified.

5. The computer of claim 4, wherein the instructions include instructions to designate one of the bounding faces of the virtual representation of the real-world space as penetrable or impenetrable by the virtual representation of the first physical item.

6. The computer of claim 1, wherein deriving the first and/or second set of dimensions comprises at least one of:
    measuring the real-world dimensions of the real-world space and/or the first physical item;
    extracting the real-world dimensions of the real-world space and/or the first physical item form a dataset; and
    determining the real-world dimensions of the real-world space and/or the first physical item.

7. The computer of claim 1, wherein the instructions include instructions to arrange the virtual representations of the first and second physical items so that both items fit within the virtual representation of the real-world space.

8. The computer of claim 1, wherein the instructions include instructions to derive a set of dimensions of the first physical item, the second physical item, or the real-world space by:
    selecting a first position;
    selecting a second position to define a one-dimensional line between the first and second positions;
    selecting a third position to define a two-dimensional area spanned by the first, second, and third position; and
    selecting a fourth position to define a three-dimensional volume spanned by the first, second, third, and fourth positions, wherein at least one dimension in the set of dimensions is the length of a line between two of the four positions.

9. The computer of claim 1, wherein the instructions include instructions to derive a virtual representation of the first physical item, the second physical item, or the real-world space by:
    selecting a virtual first position in the virtual environment;
    selecting a virtual second position in the virtual environment to define a one-dimensional virtual line between the first and second virtual positions;
    selecting a virtual third position to define a two-dimensional virtual area spanned by the first, second, and third virtual positions; and
    selecting a fourth virtual position to define a three-dimensional virtual volume spanned by the first, second, third, and fourth positions, the three-dimensional virtual volume being the virtual representation of the first physical item, the second physical item, or real-world space.

10. The computer of claim 1, wherein the instructions include instructions to store at least one of the first set of dimensions, the second set of dimensions, the third set of dimensions, the virtual representation of the first physical item, the virtual representation of the real-world space, or the virtual representation of the second physical item, in a database.

11. The computer of claim 10, wherein the instructions include instructions to store the dimensions and virtual representation with metadata describing whether the dimensions or the representation describe a physical item or a real-world space.

12. The computer of claim 1, wherein the instructions include instructions to:
- derive a plurality of sets of dimensions, each set of dimensions corresponding to a respective physical item; and
- derive a plurality of virtual representations, each virtual representation of the plurality being a virtual representation of a respective physical item, from a respective set of dimensions, wherein each virtual representation of the physical items is represented as a solid item that is user-manipulatable within the virtual environment and the virtual representation of the real-world space.

13. The computer of claim 1, wherein the instructions include instructions to automatically arrange the plurality of virtual representations of the physical items in the virtual representation of the real-world space such that a parameter is optimised.

14. A computer comprising a processor and a non-transitory medium storing instructions executable by the processor to:
- derive a set of dimensions corresponding to a first physical item in the real-world and deriving, from the set of dimensions, a virtual representation of the first physical item in a virtual environment by:
- selecting a virtual first position in the virtual environment;
- selecting a virtual second position in the virtual environment to define a one-dimensional virtual line between the first and second virtual positions;
- selecting a virtual third position to define a two-dimensional virtual area spanned by the first, second, and third virtual positions; and
- selecting a fourth virtual position to define a three-dimensional virtual volume spanned by the first, second, third, and fourth positions, the three-dimensional virtual volume being the virtual representation of the first physical item, the second physical item, or real-world space, respectively,
- wherein the virtual representation of the first physical item is represented as a solid item that is user-manipulatable within the virtual environment.

15. A method comprising:
- deriving a first set of dimensions corresponding to a real-world space;
- deriving a second set of dimensions corresponding to a first physical item in the real-world space;
- deriving a virtual representation of the real-world space from the first set of dimensions in a virtual environment, the virtual representation of the real-world space represented as a hollow space, the virtual representation of the real-world space comprises a number of bounding faces defining the hollow space as a three-dimensional volume therebetween bounded by the bounding faces, each bounding face representing a boundary of the virtual representation of the real-world space, at least one of the bounding faces represents an entrance to the virtual representation of the real-world space;
- deriving a virtual representation of the first physical item from the second set of dimensions in the virtual environment, the virtual representation of the first physical item represented as a solid item that is user-manipulatable within the virtual environment and the virtual representation of the real-world space; and
- when the virtual representation of the first physical item intersects with a bounding face of the virtual representation of the real-world space, modifying the virtual representation of at least one of the first physical item and the bounding face intersecting the first physical item, unless the bounding face is the entrance to the virtual representation in which case the appearance of the virtual representation of the first physical item and the virtual representation of the real-world space are not modified.

16. A method according to claim 15, wherein, to derive a virtual representation of the first physical item, the second physical item, and/or the real-world space, the method further comprises:
- selecting a virtual first position in the virtual environment;
- selecting a virtual second position in the virtual environment to define a one-dimensional virtual line between the first and second virtual positions;
- selecting a virtual third position to define a two-dimensional virtual area spanned by the first, second, and third virtual positions; and
- selecting a fourth virtual position to define a three-dimensional virtual volume spanned by the first, second, third, and fourth positions, the three-dimensional virtual volume being the virtual representation of the first physical item, the second physical item, or real-world space, respectively.

17. The method according to claim 15, further comprising:
- designating one of the bounding faces of the virtual representation of the real-world space as penetrable or impenetrable by the virtual representation of the first physical item.

* * * * *